(12) United States Patent
Nakagiri

(10) Patent No.: US 7,268,909 B2
(45) Date of Patent: Sep. 11, 2007

(54) DOCUMENT PROCESSING METHOD AND APPARATUS

(75) Inventor: Koji Nakagiri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 492 days.

(21) Appl. No.: 10/978,415

(22) Filed: Nov. 2, 2004

(65) Prior Publication Data

US 2005/0134871 A1  Jun. 23, 2005

(30) Foreign Application Priority Data

Nov. 5, 2003  (JP)  ............................. 2003-376191

(51) Int. Cl.
G06F 15/00 (2006.01)
H04N 1/04 (2006.01)
H04N 1/46 (2006.01)
G06K 9/20 (2006.01)

(52) U.S. Cl. ..................... 358/1.16; 358/474; 358/505; 358/524; 382/312; 382/317

(58) Field of Classification Search ............... 358/1.16, 358/505, 474, 524; 382/312, 317; 412/1
See application file for complete search history.

(56) References Cited

U.S. PATENT DOCUMENTS

| | | | |
|---|---|---|---|
| 4,839,740 A | 6/1989 | Yoshida | 358/288 |
| 5,708,513 A | 1/1998 | Hasuo et al. | 358/450 |
| 6,075,622 A * | 6/2000 | Hadgis et al. | 358/474 |
| 2003/0038988 A1* | 2/2003 | Anderson et al. | 358/474 |
| 2003/0052441 A1 | 3/2003 | Nakagiri | 270/37 |
| 2003/0056177 A1 | 3/2003 | Nara et al. | 715/525 |
| 2003/0184806 A1 | 10/2003 | Nara et al. | 358/1.18 |
| 2005/0094228 A1* | 5/2005 | Sevier | 358/498 |

FOREIGN PATENT DOCUMENTS

| | | |
|---|---|---|
| EP | 1 333 384 A2 | 8/2003 |
| EP | 1 345 114 A2 | 9/2003 |

(Continued)

OTHER PUBLICATIONS

U.S. Appl. No. 09/470,204, filed Dec. 22, 1999, Satoshi Nishikawa et al.

(Continued)

*Primary Examiner*—King Y. Poon
*Assistant Examiner*—Thomas J. Lett
(74) *Attorney, Agent, or Firm*—Fitzpatrick, Cella, Harper & Scinto

(57) ABSTRACT

According to this invention, a document processing method of documenting image data obtained by double-sided scanning of an original containing a single-sided printed part and a double-sided printed part includes a blank determination step of determining on the basis of the image data whether the lower surface of an original is blank, and a documentation step of, when the lower surface is determined in the blank determination step to be blank, saving image data corresponding to the upper surface of the original as document information together with a single-sided printing attribute, and when the lower surface is determined in the blank determination step not to be blank, saving image data corresponding to the two surfaces of the original as document information together with a double-sided printing attribute.

21 Claims, 37 Drawing Sheets

FOREIGN PATENT DOCUMENTS

| | | |
|---|---|---|
| JP | 5-72854 | 3/1993 |
| JP | 7-283933 | 10/1995 |
| JP | 9-284490 | 10/1997 |
| JP | 2000-165639 | 6/2000 |
| JP | 2002-132642 | 5/2002 |

OTHER PUBLICATIONS

Apr. 21, 2005, Office Communication issued In European Patent Application No. 04256719.8-1228.

\* cited by examiner

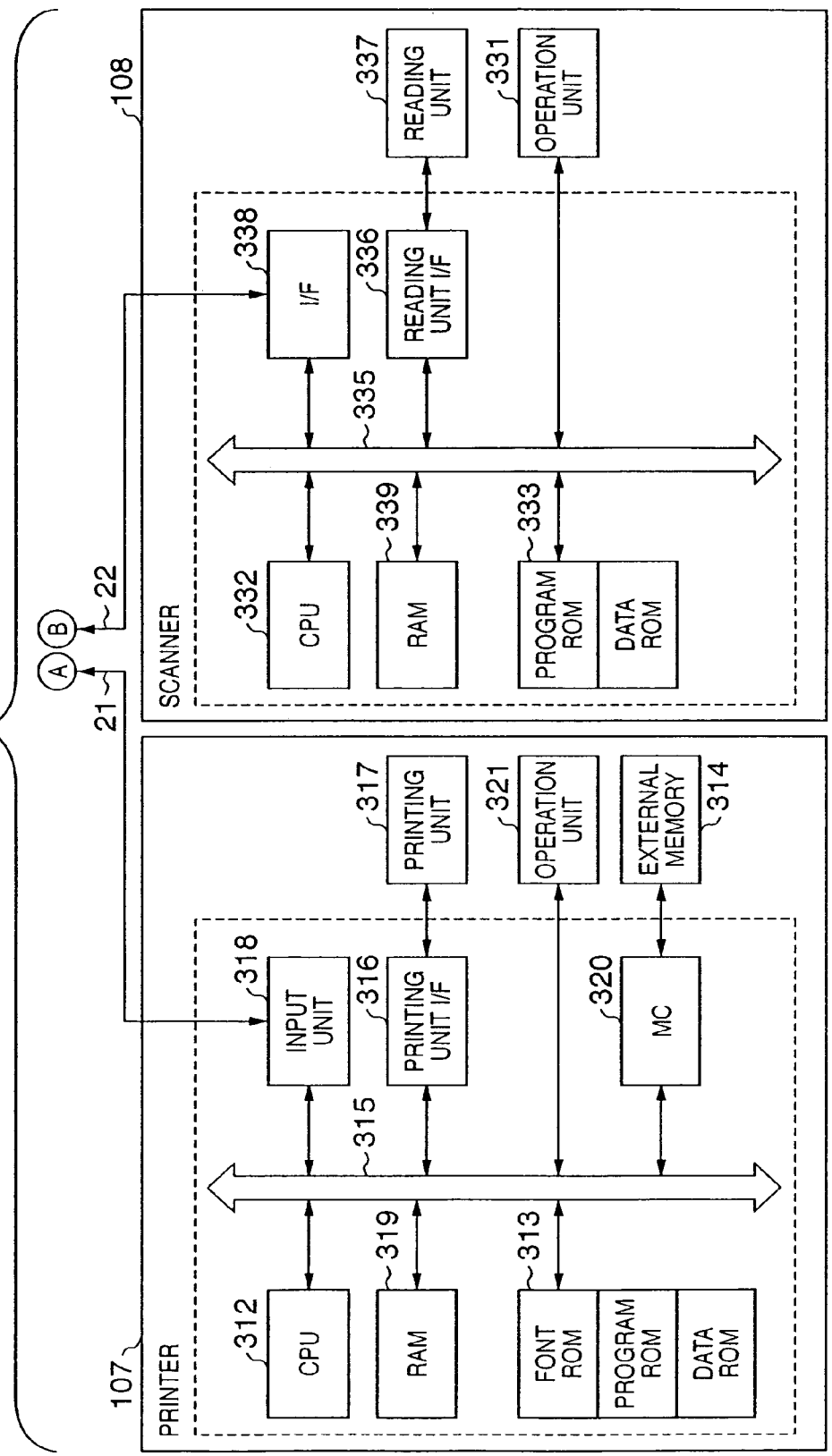

FIG. 4A

| NO | ATTRIBUTE INFORMATION | | REMARKS |
|---|---|---|---|
| 1 | PRINTING METHOD | SINGLE-SIDED/ DOUBLE-SIDED/ BOOKBINDING PRINTING | |
| 2 | PAPER SIZE | ORIGINAL SIZE/ FIXED SIZE | • Z-FOLD IS DESIGNATED WHEN "A4+A3", "B4+B3", OR "LETER+LEDGER (11x17)" IS DESIGNATED.<br>• ORIGINAL SIZE OF FIRST CHAPTER/PAGE IS AUTOMATICALLY SELECTED WHEN BOOKBINDING PRINTING OR N-up PRINTING IS DESIGNATED. |
| 3 | PAPER DIRECTION | PORTRAIT/LANDSCAPE | • SELECTABLE ONLY FOR FIXED SIZE |
| 4 | BINDING MARGIN/ BINDING DIRECTION | | • SHIFT/ENLARGEMENT & REDUCTION CAN BE DESIGNATED. |
| 5 | N-up PRINTING | NUMBER OF PAGES/ LAYOUT ORDER/BOUNDARY/ LAYOUT POSITION, ETC. | • LAYOUT POSITION: NINE PATTERNS<br>• X1 PRINTING CAN BE DESIGNATED. |
| 6 | ENLARGEMENT/ REDUCTION | ON/OFF | ON/OFF CAN BE AUTOMATICALLY DESIGNATED WHEN PAPER SIZE IS FIXED SIZE OR N-up PRINTING IS SELECTED. |
| 7 | WATERMARK | | • WATERMARK CAN BE DESIGNATED INDIVIDUALLY IN LOGICAL OR PHYSICAL PAGES.<br>• ALL CHAPTERS/PAGES ARE TARGETED. |

FIG. 4B

| | | | |
|---|---|---|---|
| 8 | HEADER/FOOTER | | • HEADER/FOOTER CAN BE DESIGNATED INDIVIDUALLY IN LOGICAL OR PHYSICAL PAGES.<br>• ALL CHAPTERS/PAGES ARE TARGETED. |
| 9 | DELIVERY METHOD | STAPLING/PUNCH HOLE | • STAPLING/PUNCHING ONLY IN SINGLE-/DOUBLE-SIDED PRINTING<br>• STAPLING AT ONE/TWO PORTIONS |
| 10 | DETAILS OF BOOKBINDING | OPENING DIRECTION/SADDLE STITCH/ ENLARGEMENT & REDUCTION DESIGNATION/BINDING MARGIN/ FASCICLE DESIGNATION, ETC. | • ONLY IN BOOKBINDING PRINTING |
| 11 | FRONT/BACK COVER | | • PRINTING IS DESIGNATED FOR 1/2 FRONT COVER OR 1/2 BACK COVER.<br>• FEED PORT (INCLUDING INSERTER) IS DESIGNATED. |
| 12 | INDEX SHEET | | • PRINTING OF CHARACTER STRING ON INDEX PORTION OR ANNOTATION ON INDEX SHEET CAN BE SET.<br>• BOOKBINDING PRINTING CANNOT BE DESIGNATED. |
| 13 | SLIP SHEET | | • FEED PORT (INCLUDING INSERTER) IS DESIGNATED.<br>• ORIGINAL DATA CAN BE PRINTED ON INSERTED PAPER.<br>• BOOKBINDING PRINTING CANNOT BE DESIGNATED. |
| 14 | CHAPTERING | "NONE"/"PAGE BREAK"/ "PAPER CHANGE" | • "PAPER CHANGE" IS FIXED WHEN INDEX SHEET OR SLIP SHEET IS DESIGNATED.<br>• "PAPER CHANGE" IN SINGLE-SIDED PRINTING |

FIG. 5

| NO | ATTRIBUTE INFORMATION | | REMARKS |
|---|---|---|---|
| 1 | PAPER SIZE | ORIGINAL SIZE/ FIXED SIZE | • "PAPER CHANGE" IS AUTOMATICALLY DESIGNATED WHEN FIXED SIZE IS SELECTED.<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK. |
| 2 | PAPER DIRECTION | PORTRAIT/LANDSCAPE | • SELECTABLE ONLY FOR FIXED SIZE |
| 3 | N-up PRINTING DESIGNATION | NUMBER OF PAGES/ LAYOUT ORDER/ BOUNDARY/ LAYOUT POSITION, ETC. | • LAYOUT POSITION: NINE PATTERNS<br>• X1 PRINTING CAN BE DESIGNATED. |
| 4 | ENLARGEMENT/ REDUCTION | ON / OFF | • ON/OFF CAN BE AUTOMATICALLY DESIGNATED WHEN PAPER SIZE IS FIXED SIZE OR N-up PRINTING IS SELECTED. |
| 5 | WATERMARK | DISPLAY/NON-DISPLAY | • WHETHER TO DISPLAY ALL WATERMARKS DESIGNATED BY BOOK IS DESIGNATED. |
| 6 | HEADER/FOOTER | DISPLAY/NON-DISPLAY | • WHETHER TO DISPLAY ALL HEADERS/FOOTERS DESIGNATED BY BOOK IS DESIGNATED. |
| 7 | DELIVERY METHOD | STAPLING | • STAPLING CAN BE SET OFF WHEN STAPLING IS DESIGNATED BY BOOK. DEFAULT VALUE IS "ON". |

FIG. 6

| NO | ATTRIBUTE INFORMATION | | REMARKS |
|----|----------------------|---|---------|
| 1 | PAGE ROTATION DESIGNATION | | · 0°/90°/180°/270° CAN BE DESIGNATED. |
| 2 | WATERMARK | DISPLAY/ NON-DISPLAY | · WHETHER TO DISPLAY ALL WATERMARKS DESIGNATED BY BOOK IS DESIGNATED. |
| 3 | HEADER/FOOTER | DISPLAY/ NON-DISPLAY | · WHETHER TO DISPLAY ALL HEADERS/FOOTERS DESIGNATED BY BOOK IS DESIGNATED. |
| 4 | ZOOM | 50% - 200% | · MAGNIFICATION RELATIVE TO SIZE WHICH IS FIT IN VIRTUAL LOGICAL PAGE REGION AND SET AS 100% IS DESIGNATED. |
| 5 | LAYOUT POSITION | | · NINE FIXED PATTERNS, ARBITRARY POSITION IS DESIGNATED. |
| 6 | ANNOTATION | | |
| 7 | VARIABLE ITEM | | |
| 8 | PAGE SEPARATION | | |

F I G. 7
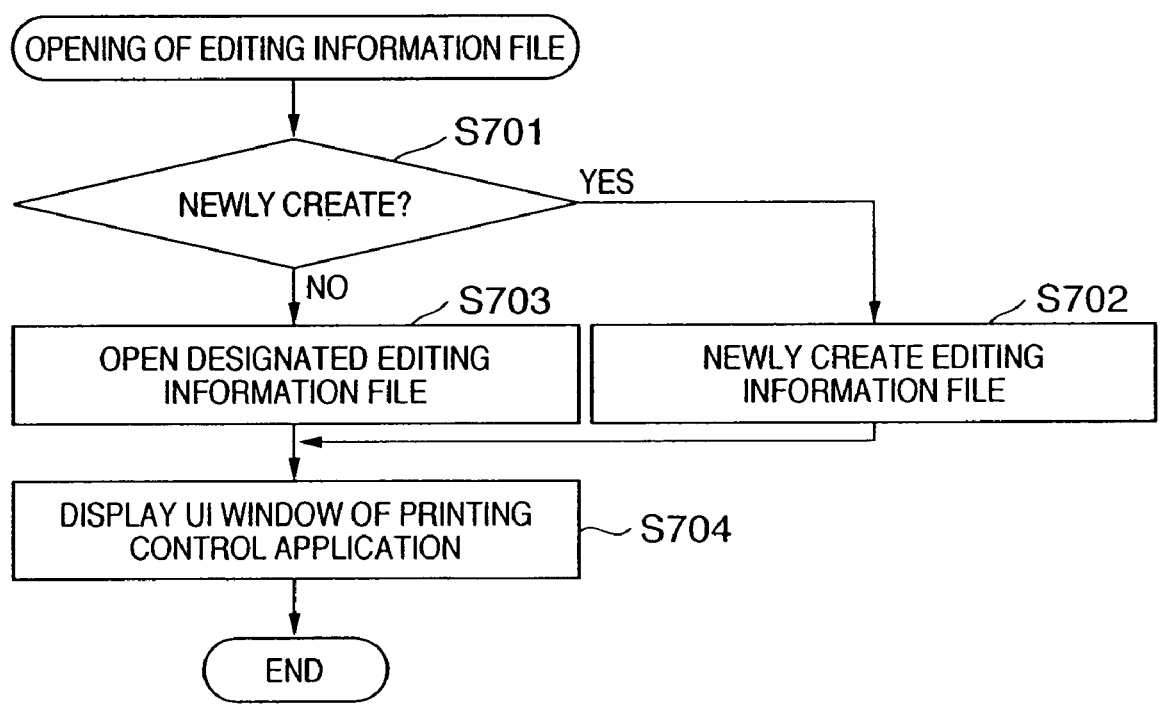

FIG. 14

DETAILED SETTING FOR DOCUMENT

| PAGE SETUP | FINISHING | EDIT | PAPER SOURCE | PRINTING QUALITY |

PAPER SIZE :
☑ ZOOM PAPER ~1401    COMPLY WITH PAGE SIZE ▶

PAPER DIRECTION :   [A] ● PORTRAIT   [A] ○ LANDSCAPE

PAGE LAYOUT :   1 PAGE/SHEET ▶
ORDER :   NONE ▶
FRAME :   NONE ▶

☐ ZOOM AREA ~1402   CANTER ▶
ZOOM ARRANGE :

OK    CANCEL    APPLY    DEFAULT
HELP

DETAILED SETTING FOR CHAPTER — 1500

| PAGE SETUP | FINISHING | EDIT | PAPER SOURCE |

☑ FOLLOW DOCUMENT ATTRIBUTE — 1501

PAPER SIZE : [COMPLY WITH PAGE SIZE ▼]

☑ ZOOM PAPER

PAPER DIRECTION : [A] ⦿ PORTRAIT  [A] ○ LANDSCAPE

☑ FOLLOW DOCUMENT ATTRIBUTE — 1502

PAGE LAYOUT : [1 PAGE/SHEET ▼]

ORDER : [NONE ▼]

FRAME : [NONE ▼]

☑ FOLLOW DOCUMENT ATTRIBUTE — 1503

☐ ZOOM AREA

ZOOM ARRANGE : [☐ CANTER ▼]

[OK] [CANCEL] [APPLY] [HELP]  [DEFAULT]

FIG. 16

DETAILED SETTING FOR CHAPTER — 1500

Tabs: PAGE SETUP | FINISHING | EDIT | PAPER SOURCE

☐ FOLLOW DOCUMENT ATTRIBUTE — 1501

- PAPER SIZE: A4
- ☑ ZOOM PAPER
- PAPER DIRECTION: ⊙ PORTRAIT  ○ LANDSCAPE

☐ FOLLOW DOCUMENT ATTRIBUTE — 1502

- PAGE LAYOUT: 4 PAGES/SHEET
- ORDER: FROM UPPER LEFT
- FRAME: NONE

☑ FOLLOW DOCUMENT ATTRIBUTE — 1503

- ☐ ZOOM AREA
- ZOOM ARRANGE: ☐ CANTER

[OK] [CANCEL] [APPLY] [DEFAULT] [HELP]

FIG. 20
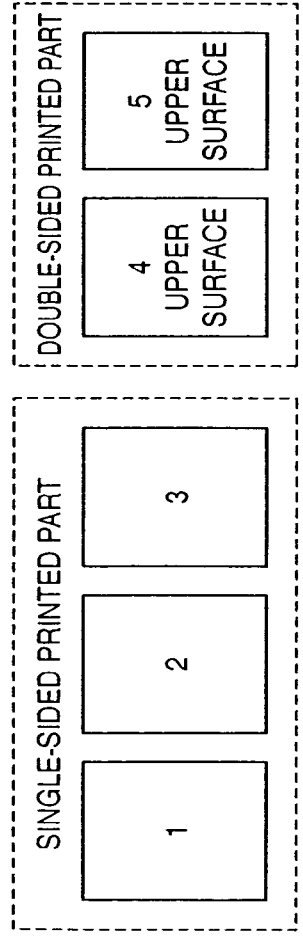
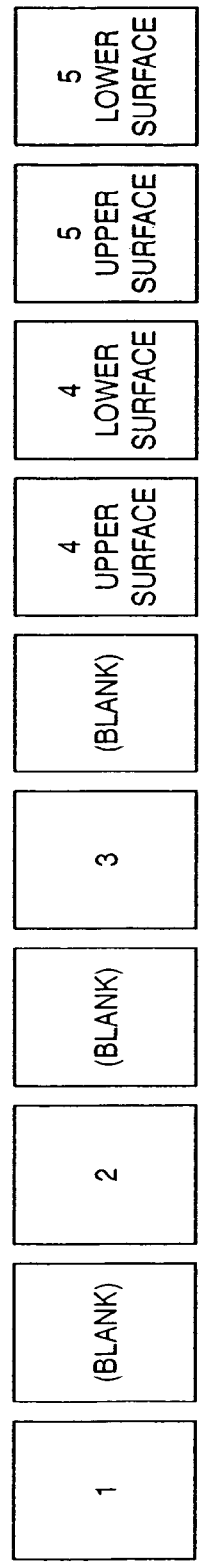

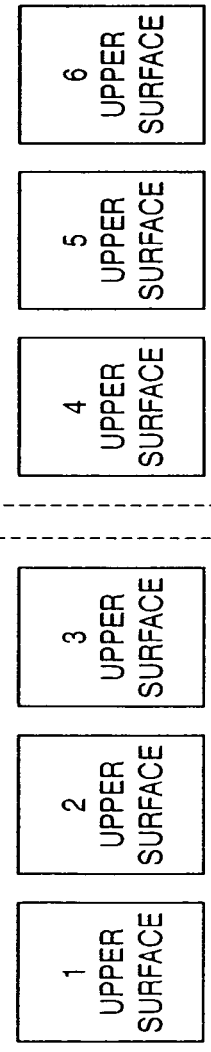
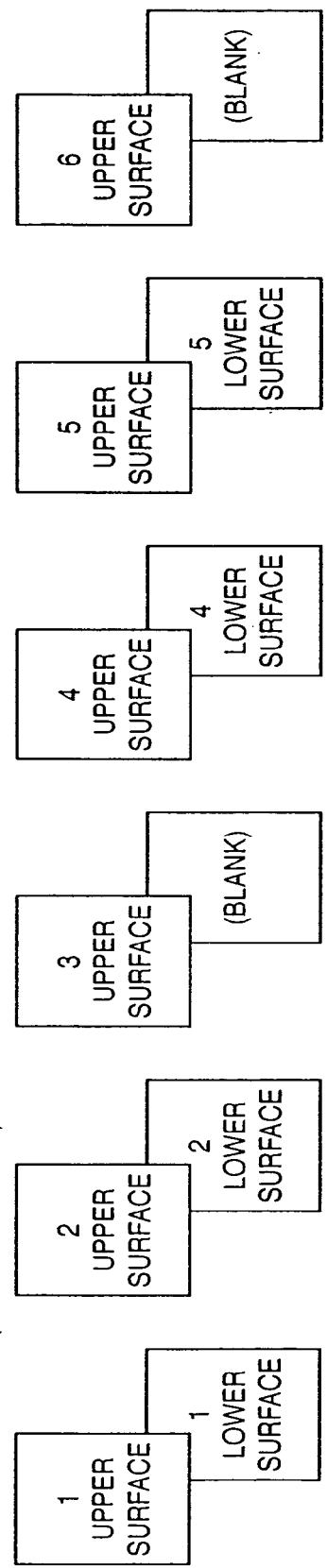
FIG. 25

F I G. 26A
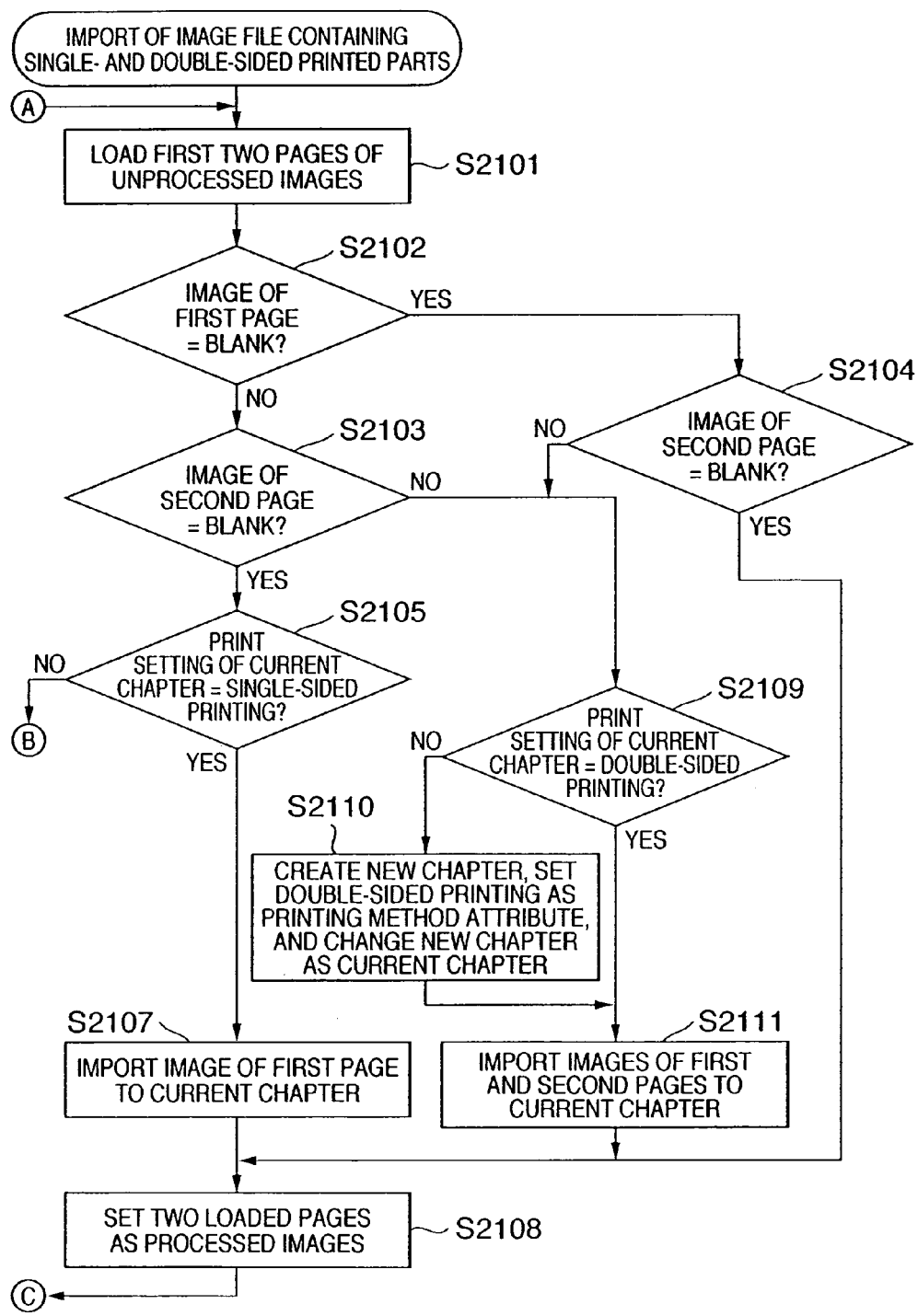

F I G. 29
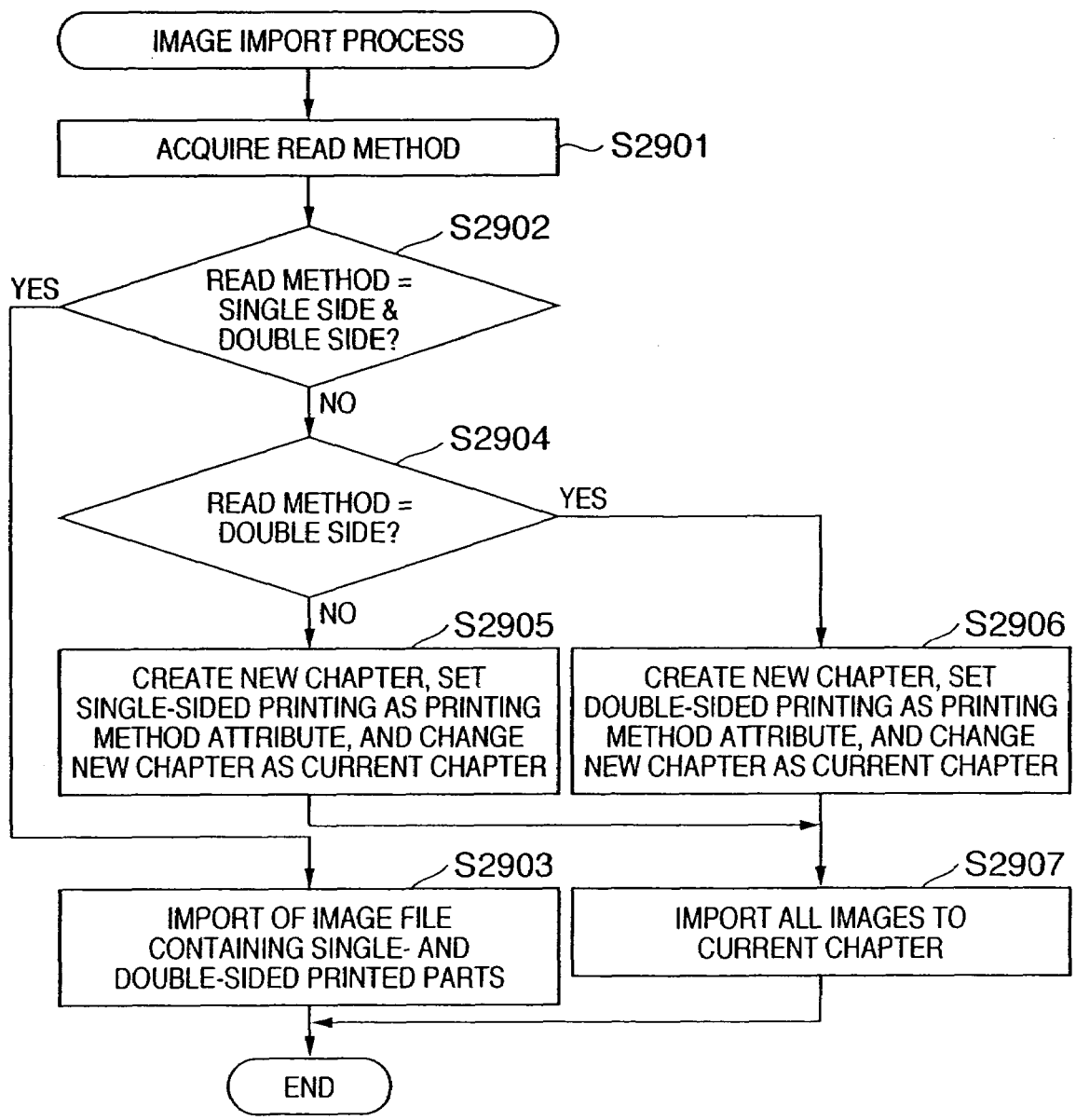

FIG. 30

| CHOICE | NAMING CONVENTION |
|---|---|
| ORIGINAL TABLE : | |
| SINGLE SIDE : | S_xxx |
| DOUBLE SIDE : | S_xxx |
| SINGLE SIDE & DOUBLE SIDE : | D_xxx |
| | DS_xxx |

F I G. 32

| FOLDER | IMPORT METHOD | PROCESS IN IMPORT |

FILE FORMAT (B): [TIFF ▶]

☑ DELETE BLANK SHEET ( ○ ) ~3201

☐ SUCCESSIVE BLANK SHEETS ARE NOT DELETED. ( ○ ) ~3202

☑ CHAPTERING ( ○ ) ~3203

CHAPTERING METHOD: ⦿ DIVIDE CHAPTER BY BLANK PAGE ( ○ )
3204
○ DIVIDE CHAPTER BETWEEN SINGLE-SIDED PAGE AND DOUBLE-SIDED PAGE ( ○ )

3205 ~☐ APPLY DOUBLE-/SINGLE-SIDED SETTING AFTER CHAPTERING

3206 ~☐ APPLY SINGLE-SIDED PAGE SUCCEEDING TO DOUBLE-SIDED PAGES
AS FINAL PAGE OF DOUBLE-SIDED

IMAGE PROCESS

☐ AUTOMATICALLY REMOVE BLACK POINT

☐ AUTOMATICALLY CORRECT SKEW

[ OK ]　　[ CANCEL ]　　[ HELP (H) ]

FIG. 34

CHAPTERING BY BLANK PAGE

CHAPTERING METHOD : ◉ DIVIDE CHAPTER BY BLANK PAGE ( ◯ )

○ DIVIDE CHAPTER BETWEEN SINGLE-SIDED PAGE AND DOUBLE-SIDED PAGE ( ◯ )

☐ APPLY DOUBLE-/SINGLE-SIDED SETTING AFTER CHAPTERING

☐ APPLY SINGLE-SIDED PAGE SUCCEEDING TO DOUBLE-SIDED PAGES AS FINAL PAGE OF DOUBLE-SIDED CHAPTER

☐ DELETE BLANK SHEET ( ◯ )

☐ SUCCESSIVE BLANK SHEETS ARE NOT DELETED. ( ◯ )

APPLY ( ◯ )    CANCEL

DOCUMENT PROCESSING METHOD AND APPARATUS

FIELD OF THE INVENTION

The present invention relates to a document processing method and printing control method of printing an original containing single- and double-sided printed parts in the same state as that of the source original when a printed material containing single- and double-sided printed parts is captured by a scanner and electronized and the electronic file is printed by a printer in a system formed from an information processing apparatus (e.g., a personal computer), scanner, and printer.

BACKGROUND OF THE INVENTION

The most popular method of copying a paper original is to utilize a copying machine. Recent digital copying machines have a read image transmission function of transmitting, as a file, image data of an original read from a scanner to a host computer (external apparatus) connected via a network (see, e.g., Japanese Patent Laid-Open No. 2002-132642).

An original is set on the scanner of a copying machine, the number of copies is input, the copy button is pressed, and then the designated number of copies can be created. According to this method, however, if an original is skewed and read by the scanner, corresponding pages of all copies are skewed and printed. Copying by the copying machine adds noise or black points to an original, degrading the image quality. This method cannot remove an unnecessary page number, header, or footer attached to an original, and add a new page number, header, or footer. Also, this method cannot provide more advanced original editing such as adjustment of a position at which a specific original page is to be printed. To solve these problems, there have conventionally been proposed two methods.

The first method is executed by a single copying machine. An original read by the scanner of the copying machine is temporarily saved in the copying machine. The user confirms the state of the saved original, and performs print settings for improving the above-mentioned problems. The saved original is then copied in accordance with the print settings (see, e.g., Japanese Patent Laid-Open No. 7-283933). This method is adopted when skew correction and removal of noise and black points are automatically executed. However, advanced editing such as header/footer editing or print position adjustment for each page is rarely executed owing to the operability and performance of the copying machine, or is performed at poor operability.

The second method enables even advanced editing by temporarily transferring an original read by the scanner of a copying machine to an information processing apparatus connected to the copying machine, and using application software with high performance and advanced functions in the information processing apparatus and high-operability interfaces such as a display, mouse, and keyboard (see, e.g., Japanese Patent Laid-Open No. 2000-165639).

Conventionally, a high-quality copy of a paper original is created by these two methods.

However, the following problems arise when a paper original is to be copied by these conventional methods, particularly when an original contains single- and double-sided printed parts and the single- and double-sided printed parts of the original are to be reproduced without any change.

In order to save labor, an entire original is scanned as a double-sided printed material without any consciousness of single- and double-sided printed parts, and printing is executed after a process such as image correction. In this case, the single-sided printed original part is also reproduced by double-sided printing. Unnecessary copying is done and charged for a lower blank surface of the single-sided printed part.

To avoid unwanted charging, very cumbersome operation must be done. That is, an original is sorted into single- and double-sided printed original parts, and each sorted part is scanned. Single- or double-sided printing is designated for each scanned part, and printing is executed by a designated number of copies.

SUMMARY OF THE INVENTION

The present invention has been made in consideration of the above situation, and has as its object to provide a document processing method and apparatus which eliminate cumbersome operation and unwanted charging when a paper original is to be copied, particularly when an original contains single- and double-sided printed parts and the single- and double-sided printed parts of the original are to be reproduced without any change.

To achieve the above object, the present invention has the following configuration.

A document processing method of documenting image data obtained by double-sided scanning of an original containing a single-sided printed part and a double-sided printed part comprises a blank determination step of determining on the basis of the image data whether a lower surface of an original is blank, and a documentation step of, when the lower surface is determined in the blank determination step to be blank, saving image data corresponding to an upper surface of the original as document information together with a single-sided printing attribute, and when the lower surface is determined in the blank determination step not to be blank, saving image data corresponding to two surfaces of the original as document information together with a double-sided printing attribute.

A document processing apparatus which documents image data obtained by double-sided scanning of an original containing a single-sided printed part and a double-sided printed part is characterized by comprising blank determination means for determining on the basis of the image data whether a lower surface of an original is blank, and documentation means for, when the blank determination means determines that the lower surface is blank, saving image data corresponding to an upper surface of the original as document information together with a single-sided printing attribute, and when the blank determination means determines that the lower surface is not blank, saving image data corresponding to two surfaces of the original as document information together with a double-sided printing attribute.

Embodiments and the above means correspond as follows. The blank determination means corresponds to step S2103 in the sequence of FIG. 21 or FIGS. 26A and 26B executed by a computer 100. The documentation means corresponds to steps S2106, S2107, S2110, and S2111 in FIG. 21 executed by the computer 100. Also, the documentation means corresponds to steps S2106, S2107, S2605, S2110, and S2111 in FIGS. 26A and 26B.

With the above configuration, a paper original containing single- and double-sided printed parts can be copied without any cumbersome operation while preventing consumption of the device and unwanted charging.

Document information can be appropriately divided by reflecting the composition of a set original.

Document information can be printed while suppressing blank sheets, thereby preventing consumption of the device and unwanted charging.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A and 2B are block diagrams showing an example of a hardware configuration which implements the document processing system according to the embodiment;

FIGS. 4A and 4B are tables showing a list of book attributes;

FIG. 5 is a table showing a list of chapter attributes;

FIG. 6 is a table showing a list of page attributes;

FIG. 7 is a flowchart showing an example of a sequence of opening a book file;

FIG. 14 is a view showing an example of a dialog window for setting a whole document serving as the uppermost layer of the data structure;

FIG. 15 is a view showing an example of a dialog window for setting a chapter serving as the intermediate layer of the data structure;

FIG. 16 is a view showing an example of setting a unique attribute in the dialog window of FIG. 15;

FIG. 20 is a view showing an example of single- and double-sided printed parts and image data obtained by double-sided scanning of them;

FIG. 25 is a view showing an example of a double-sided printed part and image data obtained by double-sided scanning of the double-sided printed part when a double-sided original has an odd number of pages;

FIGS. 26A and 26B are flowcharts showing a process sequence of importing an image file obtained by double-sided scanning as an electronic original to the bookbinding application 104 and generating a book file when a double-sided original has an odd number of pages;

FIG. 29 is a flowchart showing an image import process in the bookbinding application 104;

FIG. 30 is a table showing a naming convention for an image file on the basis of the image read method;

FIG. 32 is a UI view showing an example of a dialog box for setting a process in import for an image file to be loaded into the folder;

FIG. 34 is a UI view showing an example of a dialog box for detailed settings used to perform automatic chaptering.

DETAILED DESCRIPTION OF THE PREFERRED EMBODIMENTS

Figure 1:
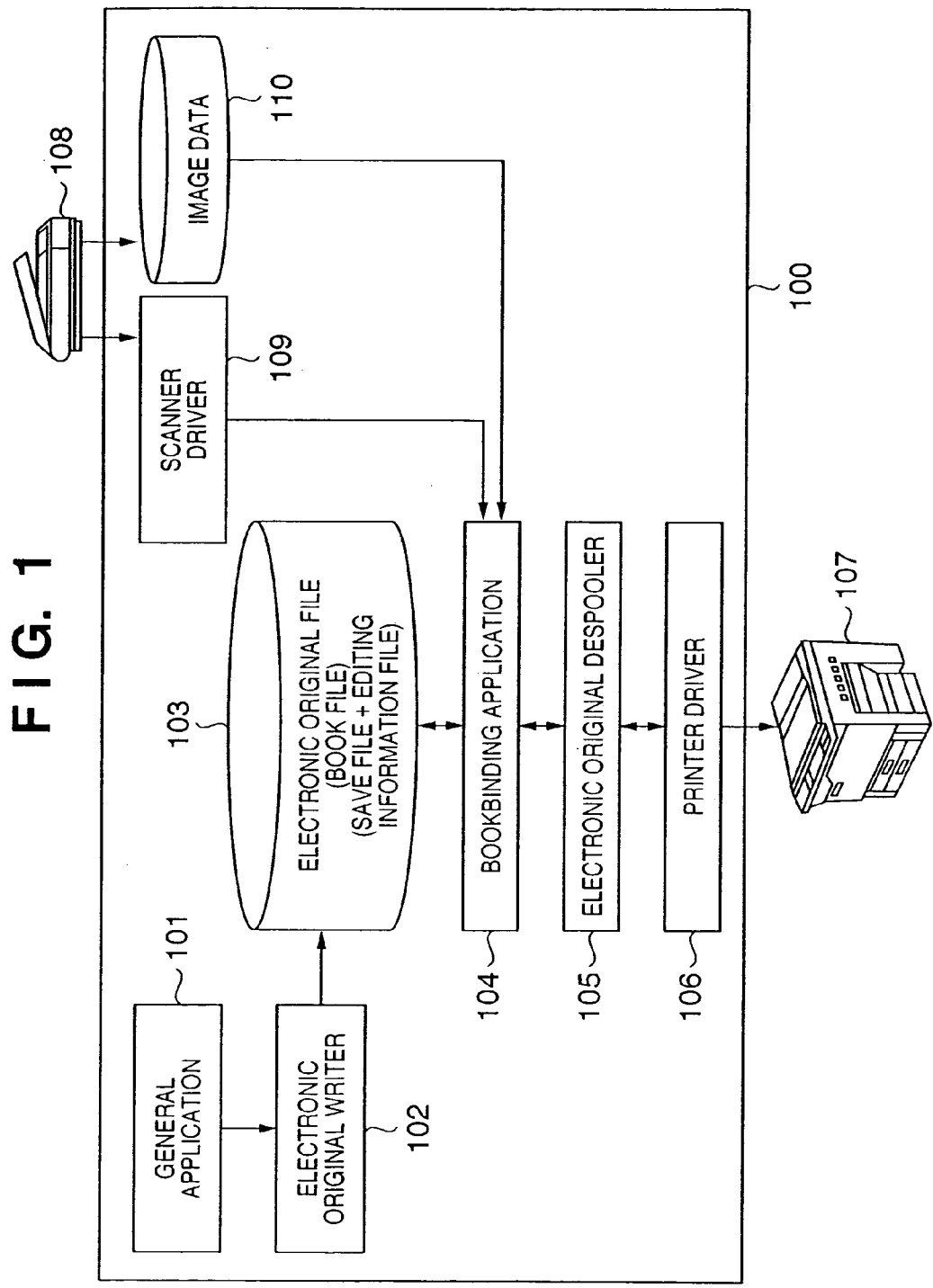
FIG. 1 is a block diagram showing an example of the software configuration of a stand-alone document processing system according to an embodiment.

Preferred embodiments of the present invention will be described in detail below with reference to the accompanying drawings.

Outline of Document Processing System According to Embodiment

A document processing system according to an embodiment can process not only image data read by a scanner but also electronic files created by various application programs. Prior to a description of the embodiment, the background in which the document processing system of the embodiment becomes necessary will be explained.

Various application programs are provided in accordance with the types of data because different data types such as a character, table, and image fetched by a digital camera or scanner require different structures for defining these data and different editing operations for these data. The user must use different applications for different data types: a character processing program for editing of characters, a spreadsheet program for editing of tables, and an image editing programs for editing of images.

The user generally uses an application program corresponding to each data type. However, a document to be created by the user is usually not a document made up of only one type of data such as only characters, tables, or images, but a document made up of a plurality of types of data such as characters and tables or characters and images. In order to create a target document containing a plurality of types of data, the user utilizes the print functions of various applications, prints data by using the applications, and combines printed materials in a desirable order.

A program called "Office Suite" which forms one integrated application from various applications provides a function of combining data generated by respective applications into one document. The use of the integrated application allows the user to combine data created by respective applications into one target document by using a specific application included in the integrated application.

However, to assign page numbers to pages when the user creates one target document by combining printed materials generated by various applications, the user must print out all necessary data, combine them into a document, and then determine page numbers to be assigned. Each application writes determined page numbers on respective pages (to be referred to as logical pages or original pages) of an original created by the application. Even if the application program has a function of assigning page numbers, the page numbers of discontinuous pages must be designated by the user. If the pages of the target document are rearranged, page numbers must be reassigned in accordance with the rearrangement. These pages must also be edited and printed again by an application when not data contents but merely the format is changed so that a plurality of original pages are combined into one page (to be referred to as a physical page or print page) as a print material, or single-sided printing is changed to double-sided printing.

Since an application which can manage data changes depending on the type of data, the user must manually provide an interface between applications. This means that much labor is demanded of the user, decreasing the productivity. Further, many manual operations readily generate errors.

The use of an integrated application for creating a target document enables arranging various data in the data state without printing them out. No heavy labor is required in comparison with creation of a target document by combining print materials. However, applications for editing and creating various data are restricted to ones included in the integrated application, so a user-desired application is not always exploited. A target document created by the integrated application is one document file, and management such as editing and output is done for each file. The application function poses many constraints on setting the format of part of a document file. For example, the user must change format settings at each portion where the format is changed, and print a target page again. This leads to much labor and low productivity, similar to the above-mentioned method.

In this background, the document processing system of the embodiment solves the above problems and achieves the object of the present invention. The document processing system can therefore process not only image data read by a scanner, but also electronic files created by various application programs.

The outline of the document processing system according to the embodiment of the present invention will be described with reference to FIGS. 1 to 13. In the document processing system, a data file created by a general application is converted into an electronic original file by an electronic original writer (to be also referred to as a print data save driver). An image read by a scanner is also converted into an electronic original file by a means such as a scanner driver or another application software. A bookbinding application (to be also referred to as a printing control application) provides a function of editing the electronic original file. In the embodiment, a general application, scanner driver, electronic original writer, bookbinding application, and electronic original despooler (to be also referred to as a printing application) are separately described for distinction between these functions. However, a package provided to the user is not limited to them, and an application or graphic engine as a combination of them may be provided, details of which will be described below.

Example of Software Configuration of Document Processing System According to Embodiment FIG. 1 is a block diagram showing the software configuration of the document processing system according to the embodiment.

The document processing system is implemented by a digital computer 100 (to be also referred to as a host computer hereafter) as a suitable embodiment of a document processing apparatus (information processing apparatus) according to the present invention. A general application 101 is an application program which provides functions such as wordprocessing, spreadsheet, photo-retouch, draw, paint, presentation, and text editing. The general application 101 has a printing function for the OS (Operating System). Such applications utilize a predetermined interface (generally called GDI) provided by the OS in printing application data such as created document data or image data. To print created data, the application 101 transmits an output command (called a GDI function) which is determined in advance for the output module of the OS providing the interface and has an OS-dependent format. The output module receives the output command, converts the command into a format processible by an output device such as a printer, and outputs the converted command (called a DDI function). Since the format processible by the output device changes depending on the type of device, the manufacturer, and the model, a device driver is provided for each device. The OS converts a command by using the device driver to generate print data, and combines the print data by JL (Job Language) to generate a print job. When the OS is Microsoft Windows®, the output module is a GDI (Graphical Device Interface) module.

An electronic original writer 102 is an improvement of the above-mentioned device drivers, and is a software module provided to implement the document processing system. The electronic original writer 102 does not target a specific output device, and generates an output command of a format processible by a bookbinding application 104 or printer driver 106 (to be described later). The format (to be referred to as an "electronic original format" hereinafter) converted by the electronic original writer 102 is not particularly limited as far as each original page can be expressed by a detailed format. Of substantial standard formats, for example, the PDF format by Adobe Systems and the SVG format can be adopted as electronic original formats.

When the application 101 utilizes the electronic original writer 102, the electronic original writer 102 is designated as a device driver used for output, and then caused to execute printing. An electronic original file created by the electronic original writer 102 does not have a complete electronic original file format. For this reason, the electronic original writer 102 is designated as a device driver by the bookbinding application 104, and executes conversion of application data into an electronic original file under the management of the bookbinding application 104. The bookbinding application 104 completes a new incomplete electronic original file generated by the electronic original writer 102 as an electronic original file having the following format. In case of necessity to definitely discriminate these files, a file created by the electronic original writer 102 will be called an electronic original file, and an electronic original file given a structure by the bookbinding application will be called a book file. If these files need not be particularly discriminated, a document file generated by an application, an electronic original file, and a book file are called document files (or document data).

As described above, the electronic original writer 102 is designated as a device driver, and the general application 101 prints the data. Application data is converted into an electronic original format in pages (to be referred to as "logical pages" or "original pages" hereinafter) defined by the application 101. The converted data is stored as an electronic original file 103 in a storage medium such as a hard disk. The hard disk may be the local drive of the computer which implements the document processing system according to the embodiment, or when the computer is connected to a network, may be a drive provided on the network.

The bookbinding application 104 provides the user with a function of loading (or reading) and editing the electronic original file or book file 103. The bookbinding application 104 provides no function of editing the contents of each page, but a function of editing a chapter or book structure (to be described later) made up of pages as a minimum unit.

In the embodiment, print data from the general application 101 is saved as the electronic original file 103 in the system via the electronic original writer 102. The electronic original file 103 contains an intermediate file and editing information file. The intermediate file contains content data of a print material, print setting data, and the like. Content data of a print material is data prepared by converting data created in an application by the user into an intermediate code. Print setting data is data which describes how to output content data (output form or the like). In addition, the electronic original file 103 contains application extension data called an editing information file for providing a user interface when the bookbinding application 104 prompts the user to edit the contents of the electronic original file 103 or issue an output instruction. The editing information file stores not only extension data for providing a user interface, but also print setting data which cannot be stored in an intermediate file. The editing information file can also save print settings which cannot be saved in a standard format when the intermediate file adopts the standard format.

The electronic original file 103 is loaded into (or read by) the bookbinding application 104. The bookbinding application 104 maps the contents of the intermediate file into a table in the memory. If the editing information file contains unique settings which are not stored in the intermediate file, the bookbinding application 104 reflects the settings in the table mapped in the memory. The bookbinding application 104 can change, display, save, and print the output form of the contents of the loaded intermediate file. A printing process is actually executed by an electronic original despooler 105.

To print the book file 103 edited by the bookbinding application 104, the bookbinding application 104 activates the electronic original despooler 105. The electronic original despooler 105 is a program module which is installed in the computer together with the bookbinding application. The electronic original despooler 105 is used to output drawing data to a printer driver in printing a document (book file) used by the bookbinding application. The electronic original despooler 105 reads out a designated book file (electronic original file) from the hard disk. To print each page in a format described in the book file (electronic original file), i.e., a format defined by the intermediate file and editing information file, the electronic original despooler 105 generates an output command complying with the output module (graphic engine) of the OS described above, and outputs the command to the output module (not shown). At this time, the driver 106 of a printer 107 used as an output device is designated as a device driver. The output module converts the output command received using the designated printer driver 106 of the printer 107 into a device command interpretable by the printer 107. The device command is transmitted to the printer 107, which prints an image corresponding to the command.

The system in FIG. 1 comprises a scanner, and a scanner 108 can read an image and save it as the electronic original file 103. An image can be captured from the scanner 108 by roughly two methods. One method is called a pull scan method of issuing a scan instruction from an application which is to receive an image. More specifically, an application acquires image data via a scanner driver 109. The scanner driver is generally a TWAIN or ISIS driver. The resolution and the number of colors can be set by the scanner driver.

The other method is a push scan method of issuing a scan instruction from a scanner. More specifically, the scanner stores an image file in a hard disk shared by a network. In this case, the scanner must have a network function common to the digital computer 100, and have the authority to write in a shared folder.

In push scan, the image quality of an image file is set via the panel of the scanner main body or the like. General examples of the image format are TIFF, JPEG, BMP, and PDF. In pull scan, the bookbinding application 104 directly acquires and loads image data from the scanner driver. In push scan, the bookbinding application 104 loads an image file saved in, e.g., a predetermined folder of the digital computer 100. At this time, the bookbinding application 104 monitors the folder which stores a scanned image file, or receives a scan end notification from the scanner, and can automatically load an image file without waiting for any input from the user. Alternatively, the user may instruct the bookbinding application 104 to load an image file from the digital computer 100.

Figure 2A:
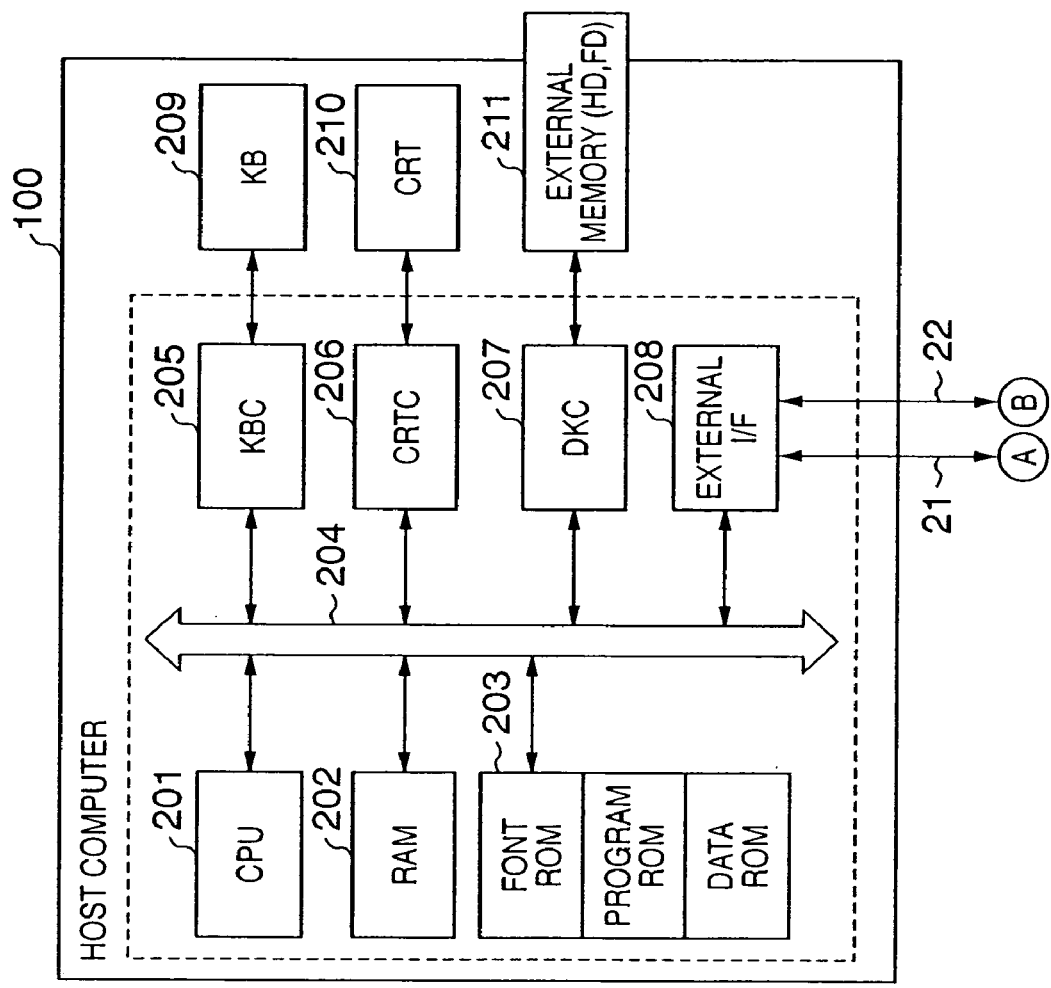

Example of Hardware Configuration of Document Processing System According to Embodiment FIGS. 2A and 2B are block diagrams showing the hardware configuration of the document processing system according to the embodiment. In FIGS. 2A and 2B, the host computer 100 comprises a CPU 201 which executes a process for a document containing figures, images, characters, tables (including spreadsheets and the like), and the like on the basis of a document processing program or the like stored in a program ROM within a ROM 203 or an external memory 211. The CPU 201 comprehensively controls devices connected to a system bus 204. The program ROM within the ROM 203 or the external memory 211 stores, e.g., an operating system program serving as the control program of the CPU 201. A font ROM within the ROM 203 or the external memory 211 stores, e.g., font data used in the document process. A data ROM within the ROM 203 or the external memory 211 stores various data used in the document process or the like. The RAM 202 functions as a main memory, work area, or the like for the CPU 201.

A keyboard controller (KBC) 205 controls a key input from a keyboard 209 or a pointing device (not shown). A CRT controller (CRTC) 206 controls the display of a CRT display (CRT) 210. A disk controller (DKC) 207 controls access to the external memory 211 such as a hard disk (HD) or flexible disk (FD) which stores a boot program, various applications, font data, user files, edited files, a scanner control program (scanner driver), a printer control command generation program (to be referred to as a printer driver hereinafter), and the like. An external interface (external I/F) 208 is connected to a printer 107 via a bidirectional interface (to be also simply referred to as an interface) 21 and the scanner 108 via a bidirectional interface 22, and executes a communication control process with the printer 107 and scanner 108. An NC 212 is connected to a network, and executes a communication control process with another device connected to the network. The printer 107 and scanner 108 may be connected via the network.

The CPU 201 executes, e.g., an outline font rasterization process to a display information RAM set in the RAM 202, and enables WYSIWYG on the CRT 210. The CPU 201 opens various registered windows and executes various data processes on the basis of commands designated on the CRT 210 with a mouse cursor (not shown) or the like. When the user executes printing, he/she opens a print setting window, and can perform setting of a printer and setting of a printing process method to the printer driver that includes selection of a print mode.

The printer 107 is controlled by a CPU 312. The printer CPU 312 outputs an image signal as output information to a printing unit (printer engine) 317 connected to a system bus 315 on the basis of a control program stored in a program ROM within a ROM 313 or a control program stored in an external memory 314. The program ROM within the ROM 313 stores, e.g., the control program of the CPU 312. A font ROM within the ROM 313 stores, e.g., font data used to generate the output information. A data ROM within the ROM 313 stores, e.g., information used in the host computer for a printer having no external memory 314 such as a hard disk.

The CPU 312 can communicate with the host computer via an input unit 318, and notify the host computer 100 of internal printer information or the like. A RAM 319 functions as a main memory, work area, or the like for the CPU 312, and the memory capacity can be expanded by an optional RAM connected to an expansion port (not shown). The RAM 319 is used as an output information mapping area, environment data storage area, NVRAM, or the like. Access to the external memory 314 such as a hard disk (HD) or IC card is controlled by a memory controller (MC) 320. The external memory 314 is connected as an option, and stores font data, emulation programs, form data, and the like. Reference numeral 321 denotes an operation panel having operation switches, an LED display, and the like.

The number of external memories 314 is not limited to one, and a plurality of external memories 314 may be arranged. A plurality of external memories which store an option card and a program for interpreting the printer control languages of different language systems in addition to built-in fonts may be connected. Further, an NVRAM (not shown) may be adopted to store printer mode setting information from the operation unit 321.

The scanner 108 is controlled by a CPU 332. The scanner CPU 332 receives an image signal serving as input information from a reading unit (scanner engine) 337 connected to a system bus 335 on the basis of a control program stored in a program ROM within a ROM 333. The program ROM within the ROM 333 stores a control program and the like for the CPU 332. A data ROM within the ROM 333 stores information and the like utilized by the CPU 332.

The CPU 332 can communicate with the host computer 100 via an I/F 338, and can notify the host computer 100 of internal scanner information or the like. A RAM 339 functions as a main memory, work area, or the like for the CPU 332, and also functions as an image memory for temporarily storing image data read by the scanner engine. The read image data is temporarily stored in the RAM 339 for each page of a sheet, and transmitted to the host computer 100.

The reading unit 337 irradiates an original image with light from a light source, focuses reflected light on an image sensor such as a CCD or CMOS via an optical system, and electronizes light. The reading unit 337 converts the electronic data into a digital signal, and inputs the digital signal to the I/F 338. The reading unit 337 may adopt a CIS. The reading unit 337 is equipped with an ADF (Automatic Document Feeder), has a function of conveying an original set on the feeder to a read position sheet by sheet, and can automatically read an original of a plurality of sheets. The ADF has a sheet reversal function, and can successively read the upper and lower surfaces of one sheet. When the upper and lower surfaces of a sheet are to be successively read, read image data is transmitted as image data of one page to the host computer after read of the upper surface. The sheet is then reversed to read the lower surface, and the image data is transmitted as image data of one page to the host computer 100. An operation panel 331 has switches for operations by the operator, e.g., push scan operation, an LED display, and the like.

Example of Format of Electronic Original Data

Before referring to details of the bookbinding application 104, the data format of a book file will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may contain a plurality of chapters, and one chapter may contain a plurality of pages.

Figure 3:
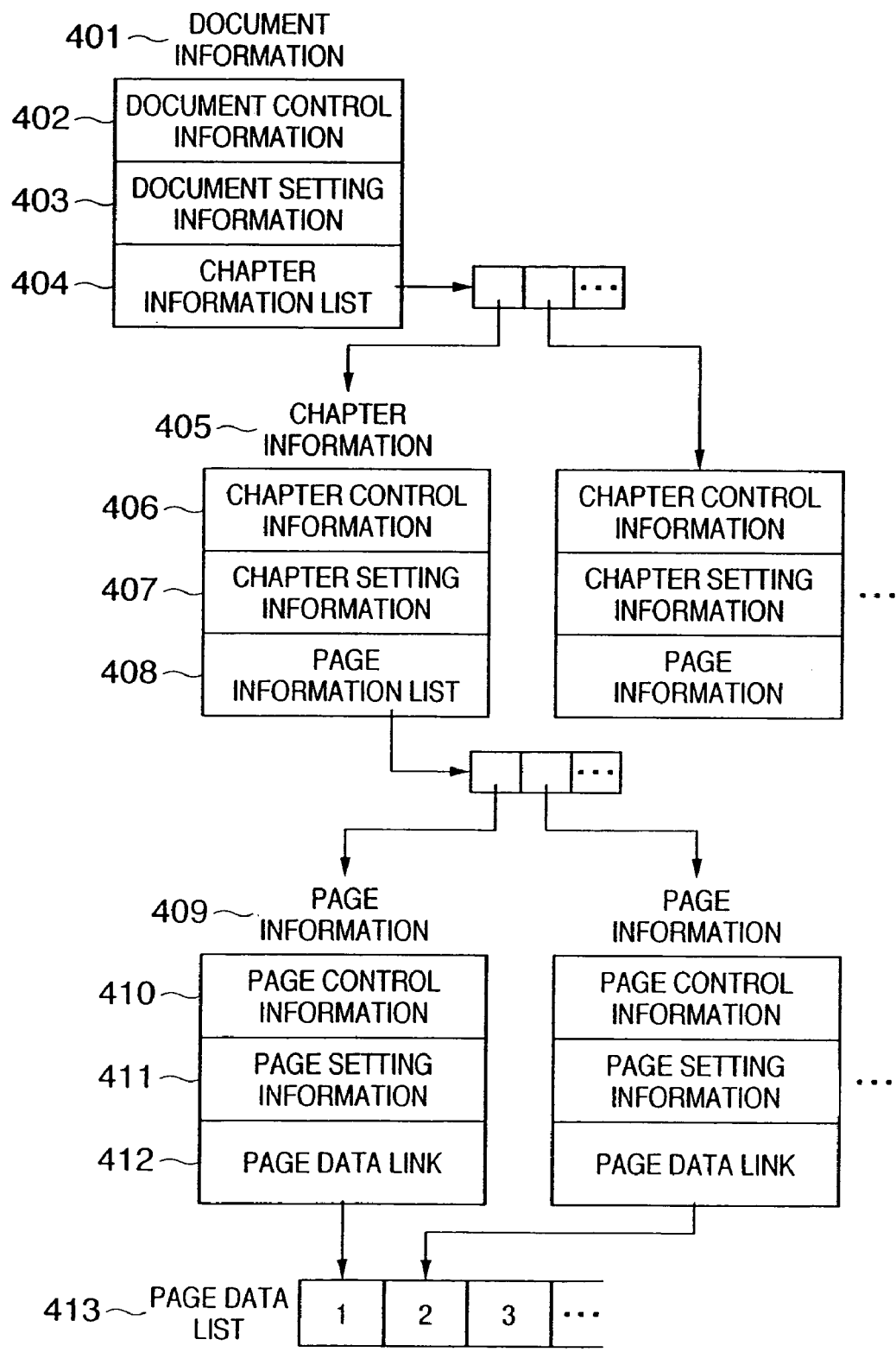
FIG. 3 is a block diagram showing an example of a book file structure.

FIG. 3 is a block diagram schematically showing an example of the book file format. The book file format is expressed by an editing information file. That is, FIG. 3 illustrates the structure of the editing information file of the electronic original file. A book, chapter, and page in the book file are represented by corresponding nodes. One book file contains one book. The book and chapter are a concept for defining a book structure, and contain, as entities, defined attribute values and links to lower layers. The page has, as entities, data of each page output from an application program. The page contains an original page entity (original page data) and a link to each original page data in addition to an attribute value. Note that a print page to be output to a paper medium may contain a plurality of original pages. This structure is displayed not by a link, but by attributes in book, chapter, and page layers.

In FIG. 3, a book file need not be one completed book, and "book" is generalized as "document".

Document information 401 is defined at the top. The document information 401 can be roughly divided into three parts 402 to 404. The document control information 402 holds information such as the path name in the file system of a document file. The document setting information 403 holds layout information such as the page layout, and function setting information of a printing apparatus such as stapling, and corresponds to book attributes. The chapter information list 404 holds as a list a set of chapters which form a document. The list holds chapter information 405.

The chapter information 405 can also be roughly divided into three parts 406 to 408. The chapter control information 406 holds information such as the chapter name. The chapter setting information 407 holds information on the page layout and stapling unique to the chapter, and corresponds to chapter attributes. By holding setting information for each chapter, a document having a complicated layout can be created so that the first chapter has a 2-up layout and the remaining chapters have a 4-up layout. The page information list 408 holds as a list a set of original pages which form each chapter. The page information list 408 designates page information data 409.

The page information data 409 can also be roughly divided into three parts 410 to 412. The page control information 410 holds information such as a page number displayed at the tree. The page setting information 411 holds information such as the page rotation angle and page layout position information, and corresponds to original page attributes. The page link information 412 is original data corresponding to a page. In this example, the page information 409 does not directly have original data, but has only the link information 412. Actual original data is held by a page data list 413.

FIGS. 4A and 4B show a list representing an example of the book attribute (document setting information 403). In general, as for an item which can be defined repetitively on a lower layer, the attribute value of the lower layer is preferentially adopted. As for an item contained in only the book attribute, a value defined in the book attribute is effective throughout the book. An item repetitively defined on a lower layer is a default value used when this item is not defined in the lower layer. In this example, however, whether to preferentially adopt the attribute value of a lower layer can be selected (to be described later). Each item shown in FIGS. 4A and 4B does not correspond to one concrete item, but may contain a plurality of relevant items.

Items unique to the book attribute are five items: details of bookbinding, front/back cover, index sheet, slip sheet (inserting paper), and chaptering. These items are defined throughout the book. As the printing method attribute, three values, i.e., single-sided printing, double-sided printing, and bookbinding printing can be designated. Bookbinding printing is a method of printing in a format which allows bookbinding by bundling a separately designated number of paper sheets, folding the bundle into two, and binding the bundle. As the detailed bookbinding attribute, the opening direction and the number of paper sheets to be bundled can be designated when bookbinding printing is designated.

The front/back cover attribute includes designation of adding paper sheets serving as front and back covers when an electronic original file combined as a book is printed, and designation of contents to be printed on the added paper sheets. The index sheet attribute includes designation of inserting a tabbed index sheet separately prepared in a printing apparatus for chaptering, and designation of contents to be printed on the index (tabbed) portion. This attribute becomes effective when a printing apparatus for use is equipped with an inserter having an inserting function of inserting a paper sheet prepared separately from a print sheet into a desired position, or when a plurality of sheet cassettes can be used. This also applies to the slip sheet attribute.

The slip sheet attribute includes designation of inserting a paper sheet fed from an inserter or sheet feed cassette for chaptering, and designation of a sheet feed source when a slip sheet is inserted.

The chaptering attribute includes designation of whether to use a new paper sheet, use a new print page, or do nothing particular at a chapter break. In single-sided printing, the use of a new paper sheet and the use of a new print page are the same. In double-sided printing, successive chapters are not printed on one paper sheet if "the use of a new paper sheet" is designated, but may be printed on the obverse and reverse of one paper sheet if "the use of a new print page" is designated.

FIG. 5 shows a list representing an example of the chapter attribute (chapter setting information 407), and FIG. 6 shows a list representing an example of the page attribute (page setting information 411). The relationship between the chapter attribute and the page attribute is the same as that between the book attribute and the lower layer attribute.

As for the chapter attribute, there is no item unique to the chapter, and all items overlap those of the book attribute. In general, if the definition of the chapter attribute is different from that of the book attribute, a value defined by the chapter attribute precedes. In this example, however, whether to preferentially adopt the attribute value of a lower layer can be selected (to be described later).

Items common to only the book and chapter attributes are six items: printing method, paper size, paper direction, N-up printing designation, enlargement/reduction, and delivery method. As for the printing method attribute, the book attribute can designate three values, i.e., single-sided printing, double-sided printing, and bookbinding printing. The chapter attribute can designate whether to perform single-sided printing, i.e., single-sided printing and double-sided printing only when the book attribute designates double-sided printing. Single-sided printing and double-sided printing can be switched within one book. The N-up printing designation attribute is an item for designating the number of original pages contained in one print page. Layouts which can be designated are 1×1, 1×2, 2×2, 3×3, 4×4, and the like. The delivery method attribute is an item for designating whether to staple discharged paper sheets. The effectiveness of this attribute depends on whether a printing apparatus for use has a stapling function.

Items unique to the page attribute are a page rotation attribute, zoom, layout designation, annotation, and page separation. The page rotation attribute is an item for designating the rotation angle when an original page is laid out on a print page. The zoom attribute is an item for designating the zoom ratio of an original page. The zoom ratio is designated based on a virtual logical page region size=100%. The virtual logical page region is a region occupied by one original page when original pages are laid out in accordance with N-up designation or the like. For example, the virtual logical page region is a region corresponding to one print page for 1×1, and a region obtained by reducing each side of one print page to about 70% for 1×2.

Attributes common to the book, chapter, and page are a watermark attribute and header/footer attribute. The watermark is a separately designated image or character string printed over data created by an application. The header/footer is a watermark printed at the upper or lower margin of each page. For the header/footer, items such as a page number, and time and date which can be designated by variables are prepared. Contents which can be designated by the watermark attribute and header/footer attribute are common between the chapter and the page, but are different from those of the book. The book can set the watermark and header/footer contents, and designate how to print a watermark or header/footer throughout the book. To the contrary, the chapter and page can only designate whether to print a watermark or header/footer set by the book on the chapter or page.

Example of Operation Sequence of Document Processing System According to Embodiment Example of Book File Generation Sequence The book file has the above-described structure and contents. A sequence of creating a book file by the bookbinding application 104 and electronic original writer 102 will be explained. Creation of a book file is realized as part of book file editing operation by the bookbinding application 104.

FIG. 7 is a flowchart showing a sequence when the bookbinding application 104 opens a book file.

Figure 8:
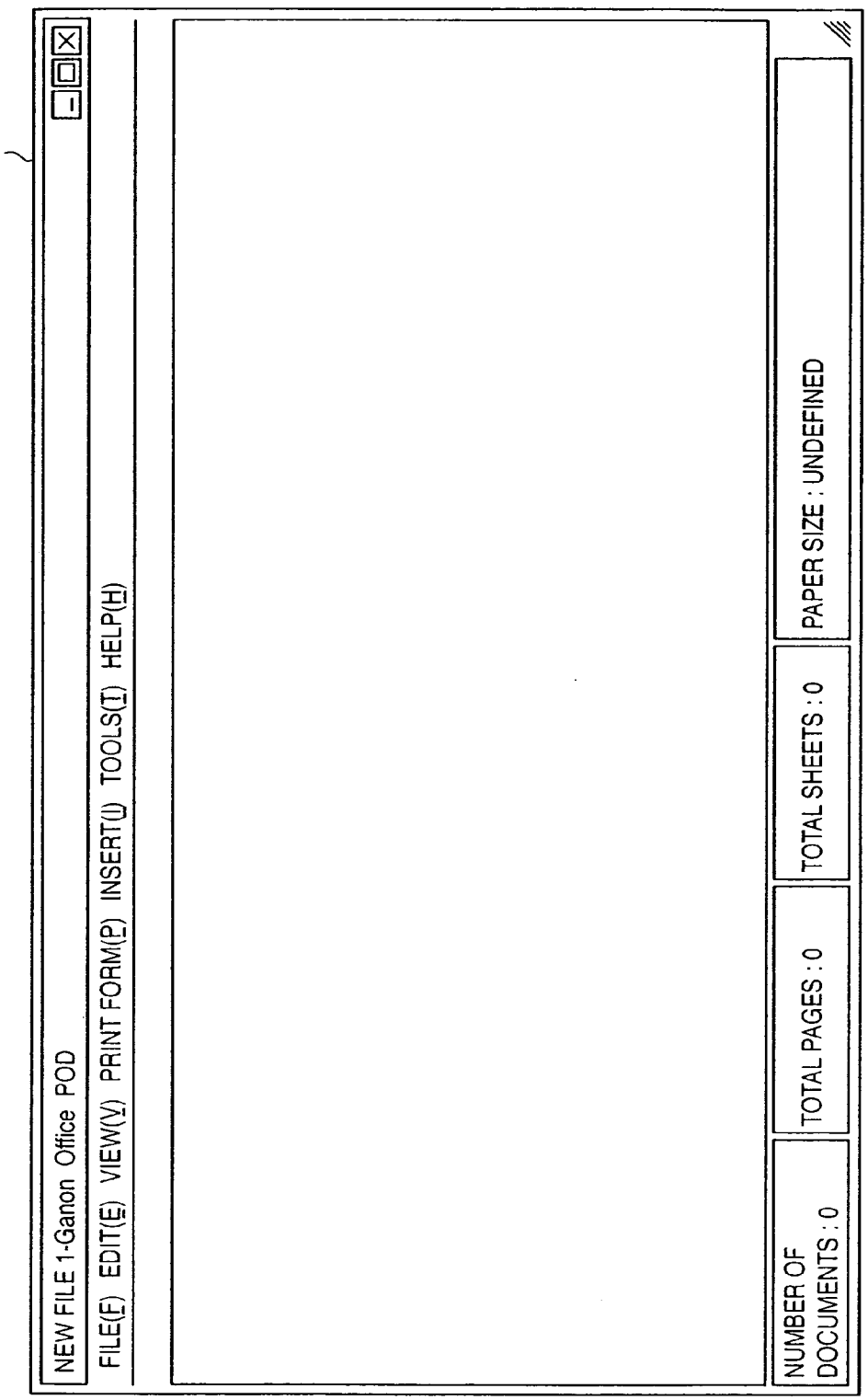
FIG. 8 is a view showing an example of a user interface window when a new book file is opened.

Whether a book file to be opened is one to be newly created or an existing one is determined (step S701). If the book file is one to be newly created, a book file containing no chapter is newly created (step S702). In the example shown in FIG. 3, the newly created book file has only a book node 301 which does not have any link to a chapter node. Applied book attributes are a set of attributes which are prepared in advance for creation of a new file. A UI (User Interface) window for editing the new book file is displayed (step S704). FIG. 8 shows an example of a UI window when a book file is newly created. In this case, the book file does not have any substantial content, and a UI window 800 does not display anything.

Figure 9:
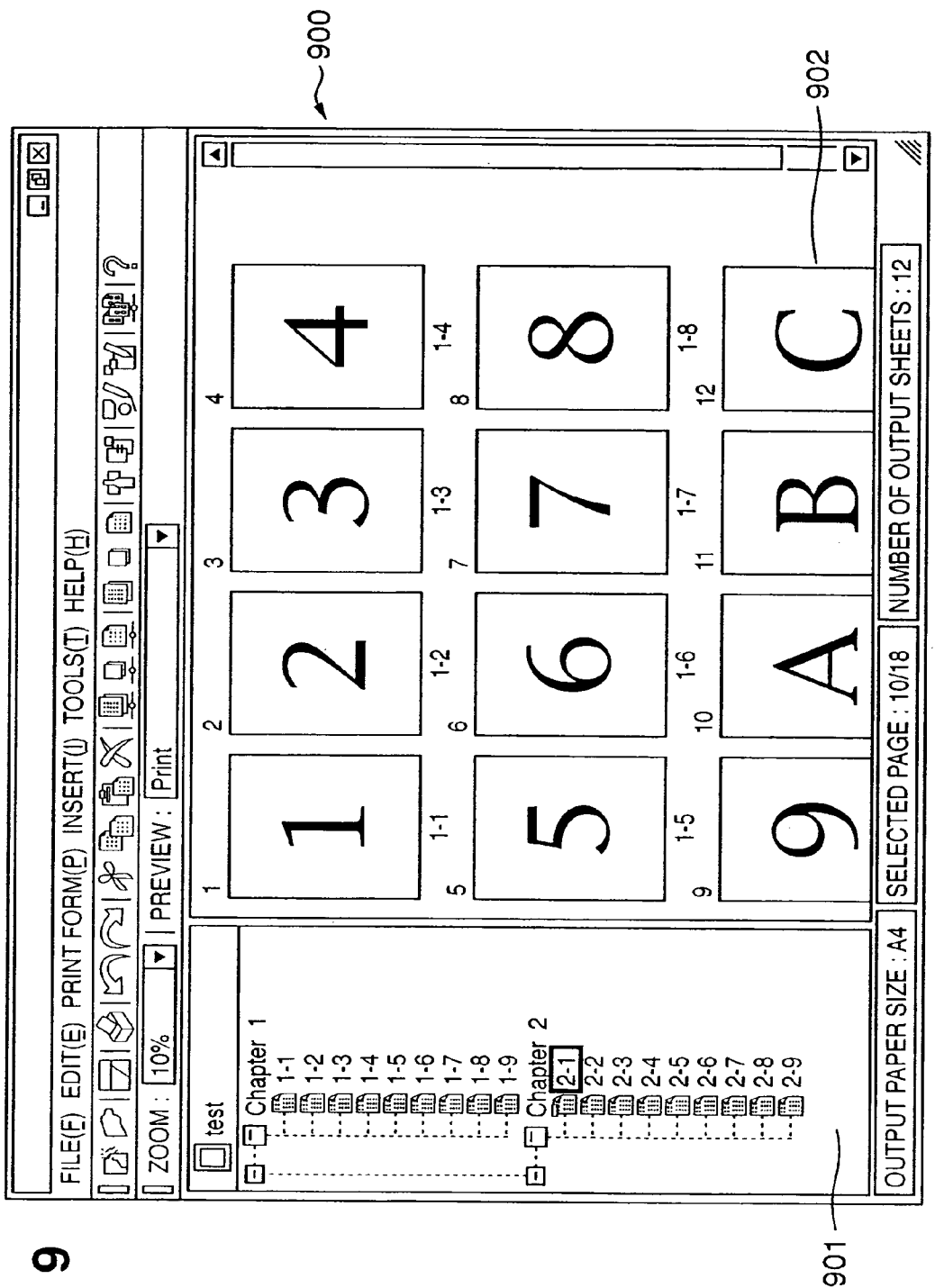
FIG. 9 is a view showing an example of a user interface window when an existing book file is opened.

If the book file is an existing one, a designated book file is opened (step S703), and a UI (User Interface) window is displayed in accordance with the structure, attributes, and contents of the book file. FIG. 9 is a view showing an example of the UI window. A UI window 900 has a tree portion 901 representing a book structure, and a preview portion 902 displaying a state to be printed. The tree portion 901 displays chapters contained in the book and pages contained in each chapter so as to present a tree structure as shown in FIG. 3. Pages displayed at the tree portion 901 are original pages. The preview portion 902 displays reduced print page contents. The display order reflects the book structure.

Application data converted into an electronic original file by the electronic original writer 102 can be added as a new chapter to the open book file. This function is called an electronic original import function. The electronic original is imported to the book file newly created by the sequence of FIG. 7, giving an entity to the book file. This function is activated by dragging and dropping application data in the window of FIG. 8 or 9.

Figure 10:
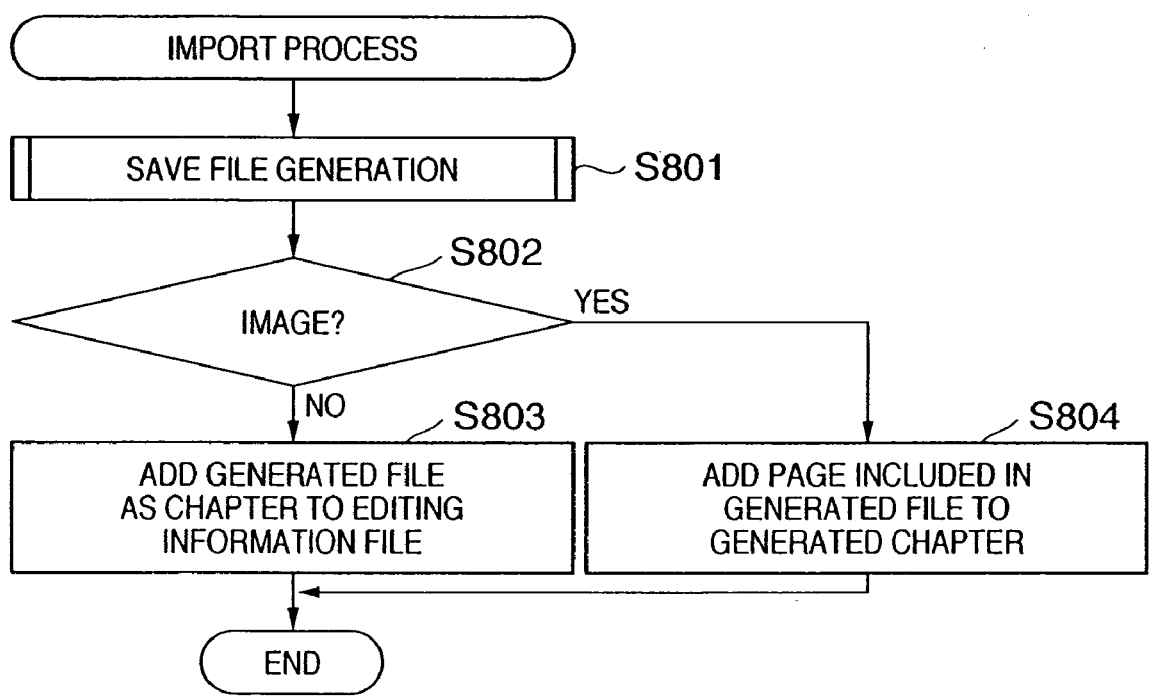
FIG. 10 is a flowchart showing an example of a sequence of importing an electronic original file to a book file.

FIG. 10 is a flowchart showing an example of an electronic original import sequence. A process of loading and importing a document as image data from the scanner 108 will be explained with reference to FIG. 21.

An application program which has generated designated application data is activated. The electronic original writer 102 is designated as a device driver, and application data is printed out to convert the data into electronic original data (step S801). After conversion, whether the converted data is image data is determined (step S802). This determination can be done on the basis of the file extension of application data under the Windows® OS. For example, an extension "bmp" represents Windows® bitmap data; "jpg", jpeg-compressed image data; and "tiff", tiff-format image data. Such image data can directly generate an electronic original file without activating any application, unlike S801, and thus the process in S801 can be omitted.

If the data is not image data, the electronic original file generated in step S801 is added as a new chapter to the book of a currently open book file (step S803). As for chapter attributes which are common to book attributes, the values of the book attributes are generally copied. As for unique chapter attributes, predetermined default values are set. In this example, whether to preferentially adopt the attribute value of a lower layer can be selected (to be described later).

If the data is image data, no new chapter is added in principle, and each original page contained in the electronic original file generated in step S801 is added to a designated chapter (step S804). If the book file is a newly created one, a new chapter is created, and each page of the electronic original file is added as a page belonging to the chapter. As for page attributes, attributes common to the attributes of an upper layer are generally given the attribute values of the upper layer, and attributes which are defined in application data and inherited to an electronic original file are given values defined in the application data. For example, when N-up designation is defined in application data, the page inherits this attribute value. In this way, a new book file is created, or a new chapter is added. In this example, however, whether to preferentially adopt the attribute value of a lower layer can be selected (to be described later).

Figure 11:
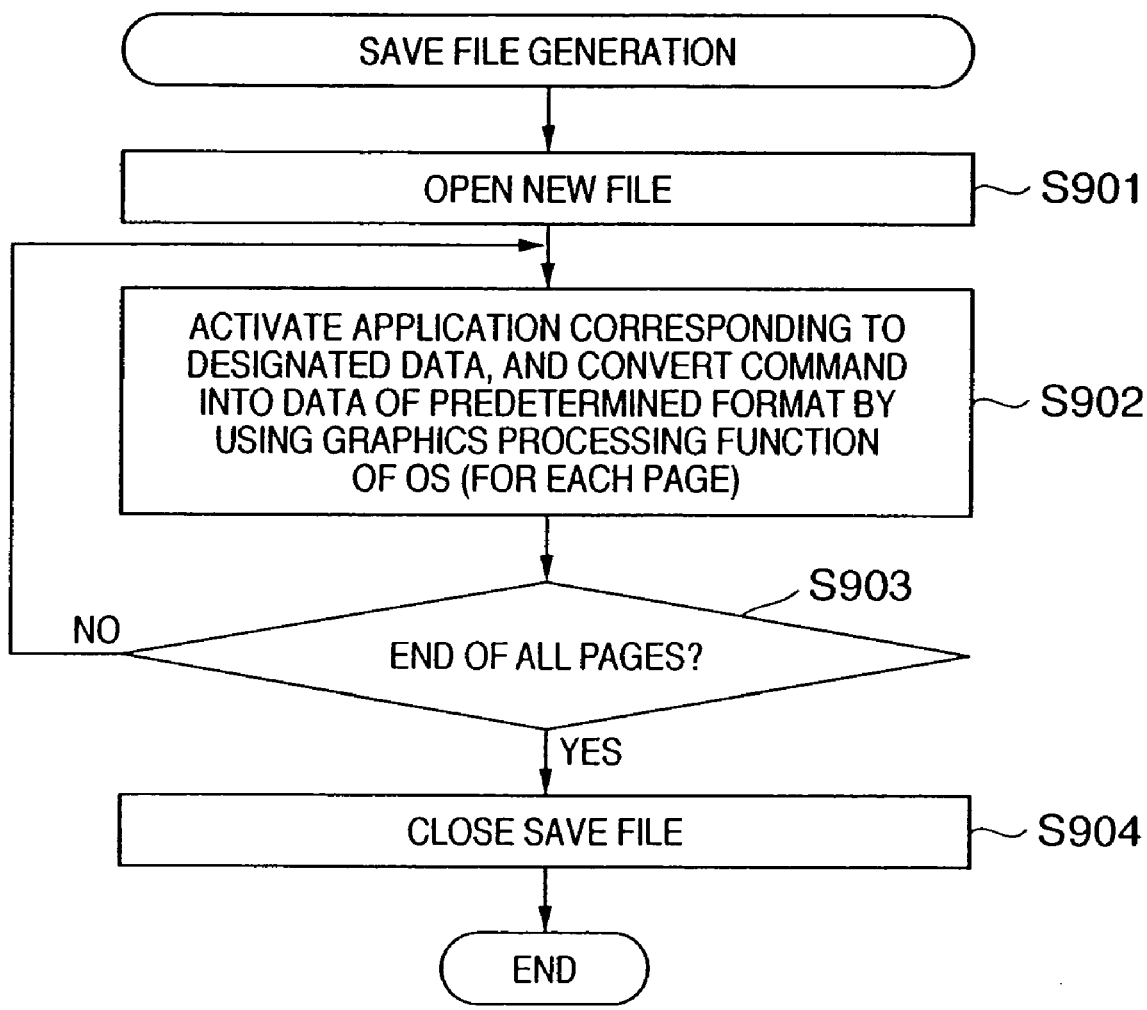
FIG. 11 is a flowchart showing an example of a sequence of converting application data into an electronic original file in step S801 of FIG. 10.

FIG. 11 is a flowchart showing a sequence of generating an electronic original file by the electronic original writer 102 in step S801 of FIG. 10.

A new electronic original file is created and opened (step S901). An application corresponding to designated application data is activated. The electronic original writer 102 is set as a device driver to transmit an output command to an OS output module. The output module converts the received output command into data of an electronic original format by the electronic original writer, and outputs the converted data (step S902). The output destination is the electronic original file opened in step S901. Whether all designated data have been converted is determined (step S903), and if YES in step S903, the electronic original file is closed (step S904). The electronic original file generated by the electronic original writer 102 is a file containing original page data entities shown in FIG. 3.

Example of Editing Book File

As described above, a book file can be created from application data. Chapters and pages in the generated book file can be edited as follows.
(1) New document
(2) Delete
(3) Copy (4) Cut
(5) Paste
(6) Move
(7) Change chapter name
(8) Reassign page number/name
(9) Insert cover
(10) Insert slip sheet
(11) Insert index sheet
(12) Page layout of each original page In addition, an operation of canceling executed editing operation, and an operation of restoring canceled operation can be performed. These editing functions enable editing operations such as consolidation of a plurality of editing information files, rearrangement of chapters and pages within a book file, delete of chapters and pages within a book file, layout change of an original page, and insertion of a slip sheet and index sheet. By these operations, operation results are reflected in attributes shown in FIGS. 4 to 6 or in the structures of the book file. For example, a blank page is inserted to a designated portion by an operation of newly adding a blank page. The blank page is processed as an original page. If the layout of an original page is changed, the change contents are reflected in attributes such as the printing method, N-up printing, front/back cover, index sheet, slip sheet, and chaptering. A display and operation example in editing will be described in detail below.

Example of Output of Book File

The ultimate goal of a book file created and edited in the above manner is to print out the file. If the user selects a file menu from the UI window 900 of the bookbinding application shown in FIG. 9 and selects printing from this menu, the book file is then printed out by a designated output device. At this time, the bookbinding application 104 creates a despool table from a currently open book file (editing information file and intermediate), and transfers the despool table to the electronic original despooler 105. The electronic original despooler 105 converts the intermediate file, i.e., job ticket in the embodiment into a despool table, converts the despool table into an OS output command, e.g., a Windows® GDI command, and transmits the command to an output module, e.g., GDI. The output module generates a command complying with a device by the designated printer driver 106, and transmits the command to the device.

The graphic engine of the output module (not shown) loads the printer driver 106 prepared for each printing apparatus from the external memory 211 to the RAM 202, and sets the output to the printer driver 106. The output module converts the received GDI (Graphic Device Interface) function into a DDI (Device Driver Interface) function, and outputs the DDI function to the printer driver 106. The printer driver 106 converts the received output into a control command such as a PDL (Page Description Language) command recognizable by the printer on the basis of the DDI function received from the output module. The converted printer control command passes through a system spooler loaded by the OS to the RAM 202, and is output as print data to the printer 107 via the interface 21.

A job ticket is a format employed in the embodiment as an intermediate file which forms the electronic original file 103. The job ticket is data having a structure whose minimum unit is an original page. The structure of the job ticket defines the layout of an original page on a paper sheet. One job ticket is issued for one print job. The document node is set at the top of the structure, and defines the attribute of the whole document such as double-sided printing/single-sided printing. This node is accompanied with a paper node containing attributes such as the identifier of paper for use and designation of a feed port in the printer. Each paper node is accompanied with a sheet node which is printed on the paper. One sheet corresponds to one paper sheet. A print page (physical page) belongs to each sheet. One physical page belongs to one sheet in single-sided printing, and two physical pages belong to one sheet in double-sided printing. An original page to be laid out on a physical page belongs to the physical page. The physical page attribute contains an original page layout.

Figure 12:
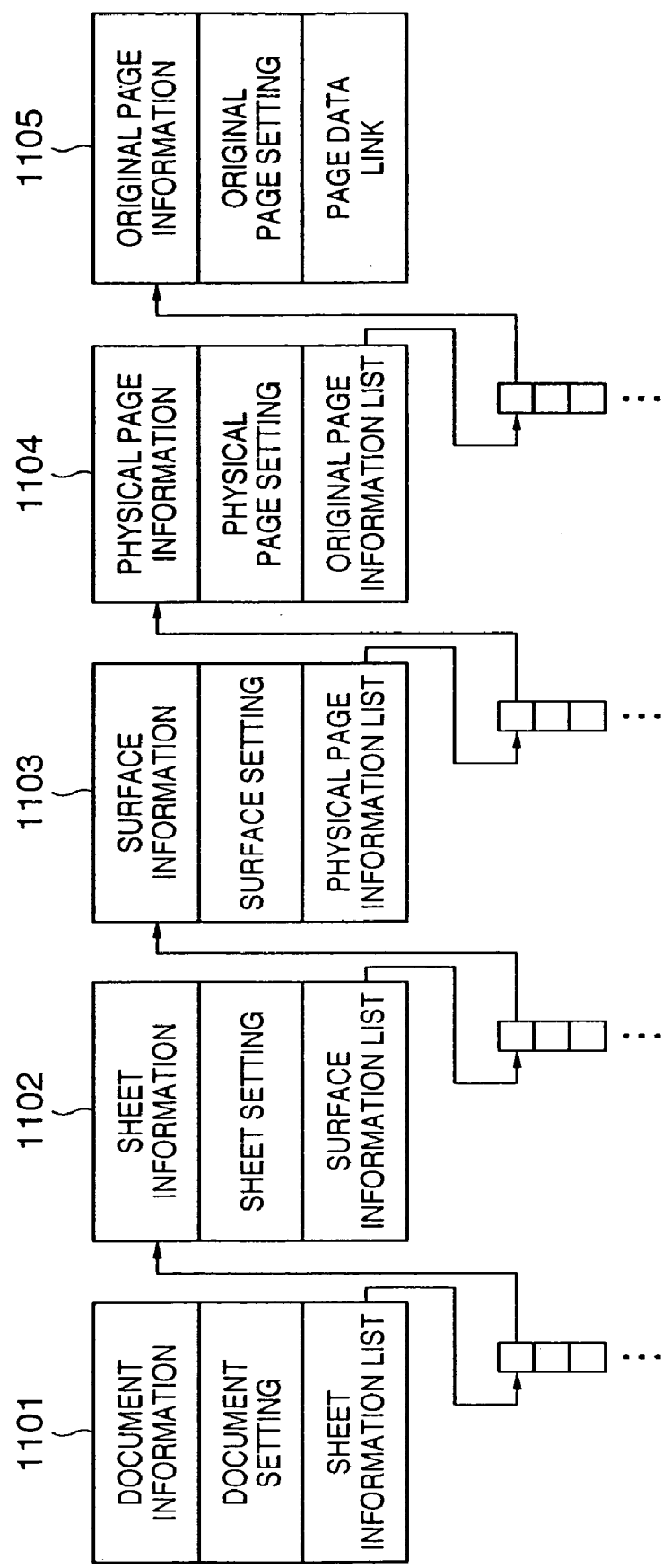
FIG. 12 is a view showing an example of a data structure used for printing and display.

FIG. 12 shows an example of the data structure of a job ticket. In print data, a document is formed from a set of sheets, and each sheet is formed from two, upper and lower surfaces. Each surface has a region (physical page) for laying out an original, and each physical page is formed from a set of original pages serving as minimum units. Reference numeral 1101 denotes data corresponding to a document. The data 1101 is made up of data on a whole document and a list of sheet information forming the document. Sheet information 1102 is formed from information on a sheet such as the sheet size, and a list of surface information laid out on the sheet. Surface information 1103 is formed from data unique to a surface, and a list of physical pages laid out on the surface. Physical page information 1104 is formed from information such as the size and header/footer of a physical page, and a list of original pages which form the physical page.

The electronic original despooler 105 creates a table (corresponding to a job ticket in FIG. 12 expressed as a table) called a despool table from the job ticket of an electronic original file. The electronic original despooler 105 converts the despool table into an output command to an output module in accordance with attributes and print settings defined in an editing information file.

Example of Preview Display Contents

As described above, when a book file is opened by the bookbinding application, the user interface window 900 shown in FIG. 9 is displayed. The tree portion 901 displays a tree representing the structure of the open book (to be referred to as a "book of interest" hereinafter). At the preview portion, three display methods are prepared in accordance with designation by the user. The first method is a mode called an original view which directly displays original pages. In the original view mode, the contents of original pages belonging to the book of interest are reduced and displayed. The display of the preview portion does not reflect any layout. The second method is a printing view mode. In the printing view mode, the preview portion 902 displays original pages in a format which reflects the layout of them. The third method is a simple printing view mode. In the simple printing view mode, the contents of original pages are not reflected in the display of the preview portion, but only the layout is reflected.

Another Example of Configuration of Document Processing System

The document processing system according to the embodiment is of a stand-alone type. A server-client system as an extension of the stand-alone system also creates and edits a book file by almost the same configuration and sequence. A book file and printing process are managed by the server.

Figure 13:
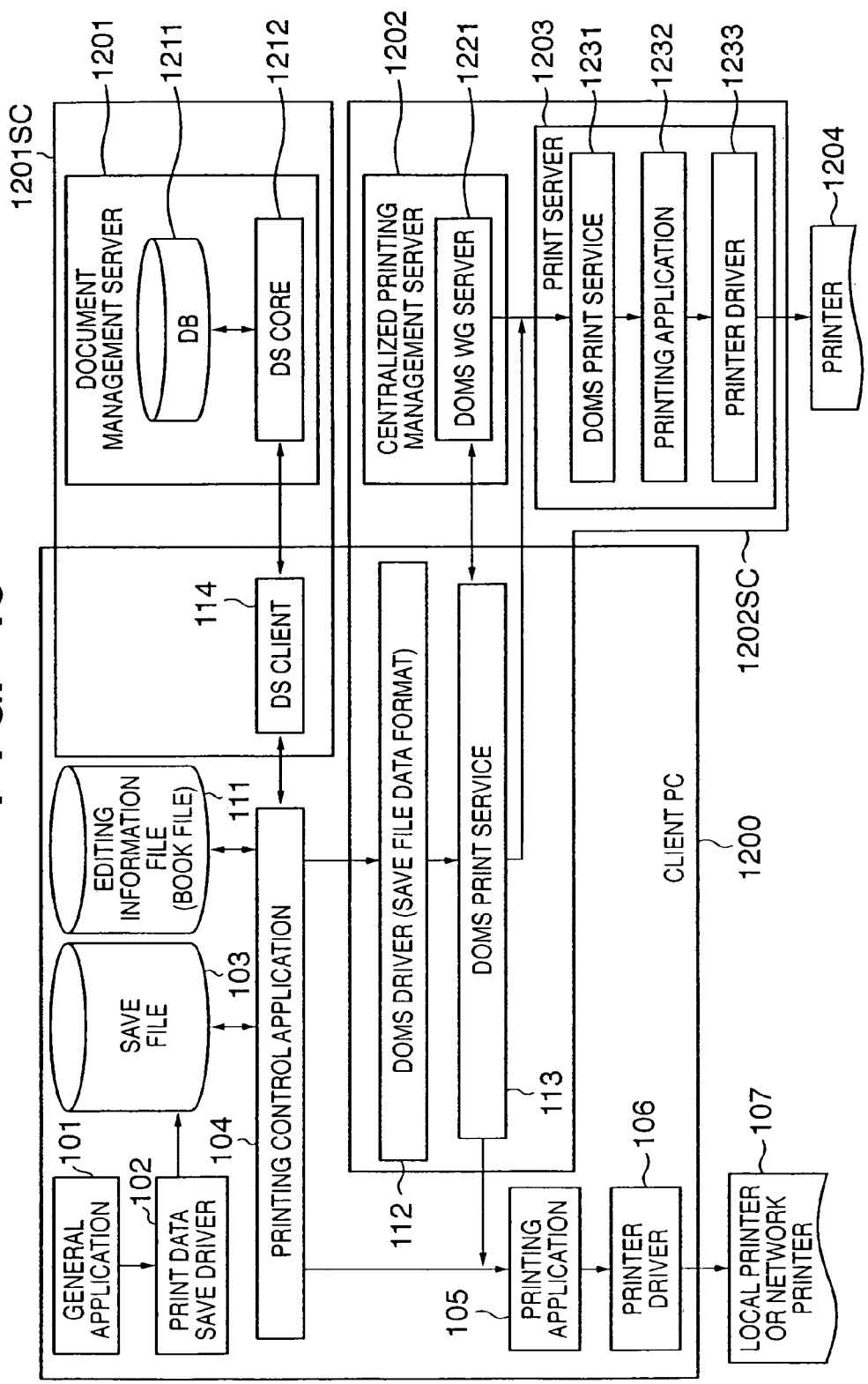
FIG. 13 is a block diagram showing an example of the software configuration of a client-server document processing system.

FIG. 13 is a block diagram showing the configuration of a server-client document processing system. The client document processing system is constituted by adding to the stand-alone system a DOMS (Document Output Management Service) driver 112 serving as a client module, a DOMS print service module 113, and a DS (Document Service) client module 114. A client document processing system 1200 is connected to a document management server 1201, centralized printing management server 1202, and print server 1203. These servers are generally connected to the client document processing system via a network. When the servers also function as clients, they are connected by interprocess communication which simulates communication between networks. The document management server 1201 and centralized printing management server 1202 are connected to the client in FIG. 13, but only either one may exist on the network. If the connected server is the document management server, a document management server-client system 1201SC including a client module is added to the stand-alone document management system. If the connected server is the centralized printing management server 1202, a printing management server-client system 1202SC including a client module is added.

The document management server 1201 stores a book file created and edited by the bookbinding application 104. To manage a book file by the document management server 1201, the book file is saved in a database 1211 of the document management server 1201 instead of or in addition to the local HD of a client PC. Save and read of a book file between the bookbinding application 104 and the document management server 1201 are done via the DS client module 114 and a DS core 1212.

The centralized printing management server 1202 manages printing of a book file stored in the client document processing system 1200 or document management server 1201. A print request from the client is transmitted to a DOMS WG server module 1221 of the centralized printing management server 1202 via the DOMS driver 112 and DOMS print service module 113. To print by the printer of the client, the centralized printing management server 1202 transfers electronic original data to the electronic original despooler 105 via the DOMS print service module 113 of the client. To print by the print server 1203, the centralized printing management server 1202 transmits electronic original data to a DOMS print service module 1231 of the print server 1203. For example, the centralized printing management server executes security check on the qualification of a user who has issued a print request for a saved book file, or saves the printing process log. In this fashion, the document processing system can be implemented as both a stand-alone system and client-server system.

Example of Editing Operation of Document Processing System According to Embodiment FIG. 9 shows the operation window of the bookbinding application 104. The bookbinding application can set the function of a printing apparatus such as stapling, in addition to editing such as a change of the page order of a document, copying, and delete. The bookbinding application can cause a designated printing apparatus to print. A tree view representing a document structure is displayed in the left region of FIG. 9. A document is formed from a set of chapters, and each chapter is formed from a set of original pages. The print preview of each page is displayed in the right region of FIG. 9.

Example of Attribute Setting of Document Processing System According to Embodiment FIG. 14 shows a "Detailed Setting for Document" window 1400 of the bookbinding application 104. This window allows displaying/setting the "document setting information 403". This window is activated from the "Detailed Setting for Document" menu of a Print Form menu in the application operation window of FIG. 9 or a "Detailed Setting for Document" button on the tool bar. The "Detailed Setting for Document" window is a window for setting attributes which influence a whole document. This window is formed from four sheets Page Setup, Finishing, Edit, and Paper Source. FIG. 14 shows a state in which the Page Setup sheet is displayed. In the Page Setup sheet, settings mainly concerning the layout can be done. Settings such as the paper size, direction, and N-page printing can be designated. This window has check box controls 1401 and 1402 for the zoom.

FIG. 15 shows a "Detailed Setting for Chapter" window 1500 of the bookbinding application 104. This window allows displaying/setting the "chapter setting information 407". This window is activated from the "Detailed Setting for Chapter" menu of a Print Form menu in the application operation window of FIG. 9 or a "Detailed Setting for Chapter" button on the tool bar. The "Detailed Setting for Chapter" window is a window for setting attributes unique to a chapter. This window is formed from four sheets Page Setup, Finishing, Edit, and Paper Source. FIG. 15 shows a state in which the Page Setup sheet is displayed. In the Page Setup sheet, settings mainly concerning a layout unique to each chapter can be done. Settings such as the paper size, direction, and N-page printing can be designated. "Follow Book Attribute" check box controls 1501, 1502, and 1503 are arranged for repetitive setting items between "Detailed Setting for Document" and "Detailed Setting for Chapter". For an item group whose check box is checked, the setting values of the document are applied to the chapter. FIG. 16 shows a case wherein the check box is not checked. Settings unique to a chapter can be classified into two types: setting items held by only a chapter, and setting items whose setting values different from those of the document in the upper layer are held in the chapter layer.

FIG. 16 shows a state in which the check box controls 1501 and 1502 of "Detailed Setting for Chapter" in FIG. 15 are not checked. In this case, even if the whole document uses A3 paper, pages which constitute this chapter use A4 paper. As for the layout, even if the document designates 1 page per sheet, the chapter designates a layout of 4 pages per sheet. "Zoom Arrange" is checked, and the setting values of the document in the upper layer are employed as those of the chapter.

Figure 17:
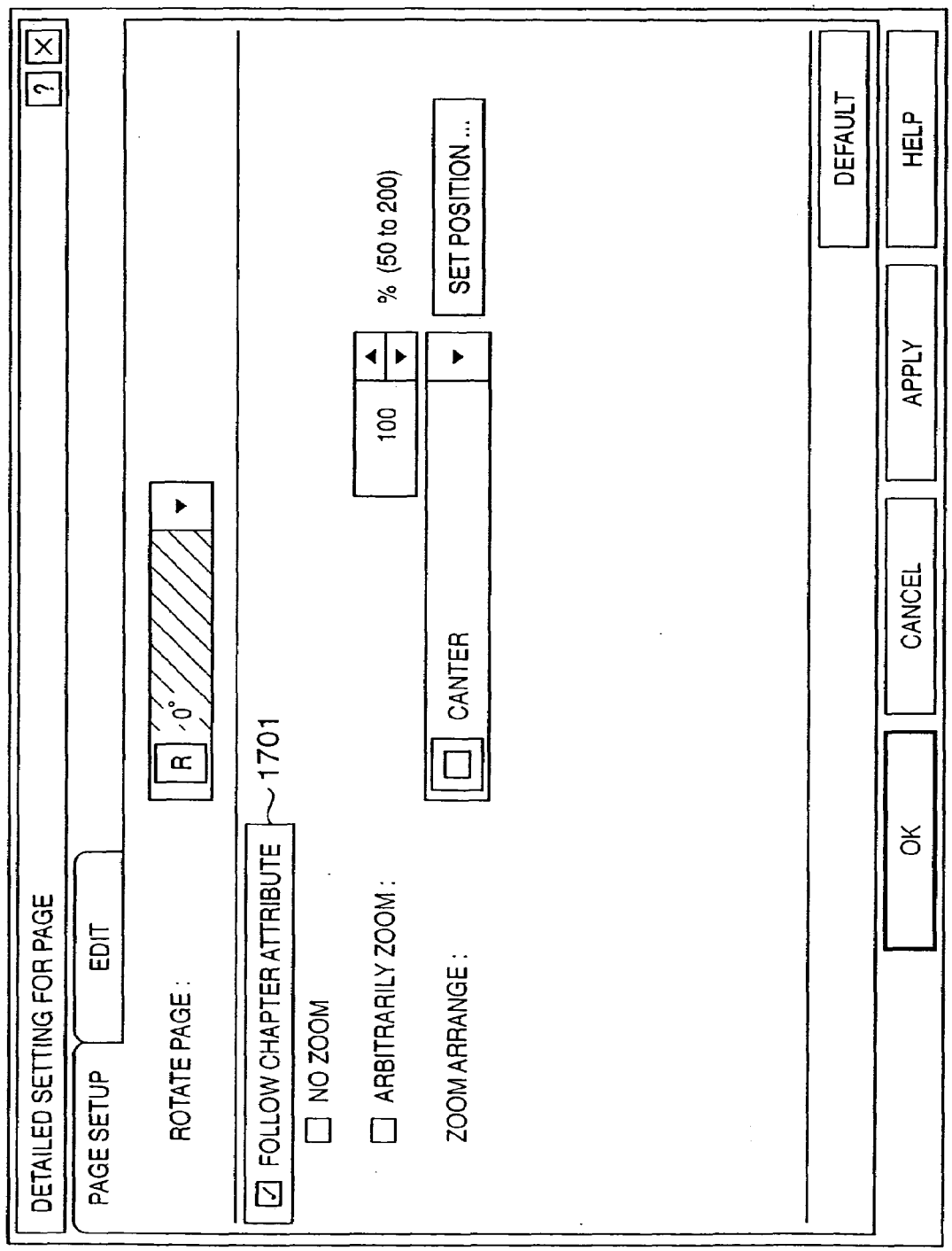
FIG. 17 is a view showing an example of a dialog window for setting a page serving as the lowermost layer of the data structure.
Figure 18:
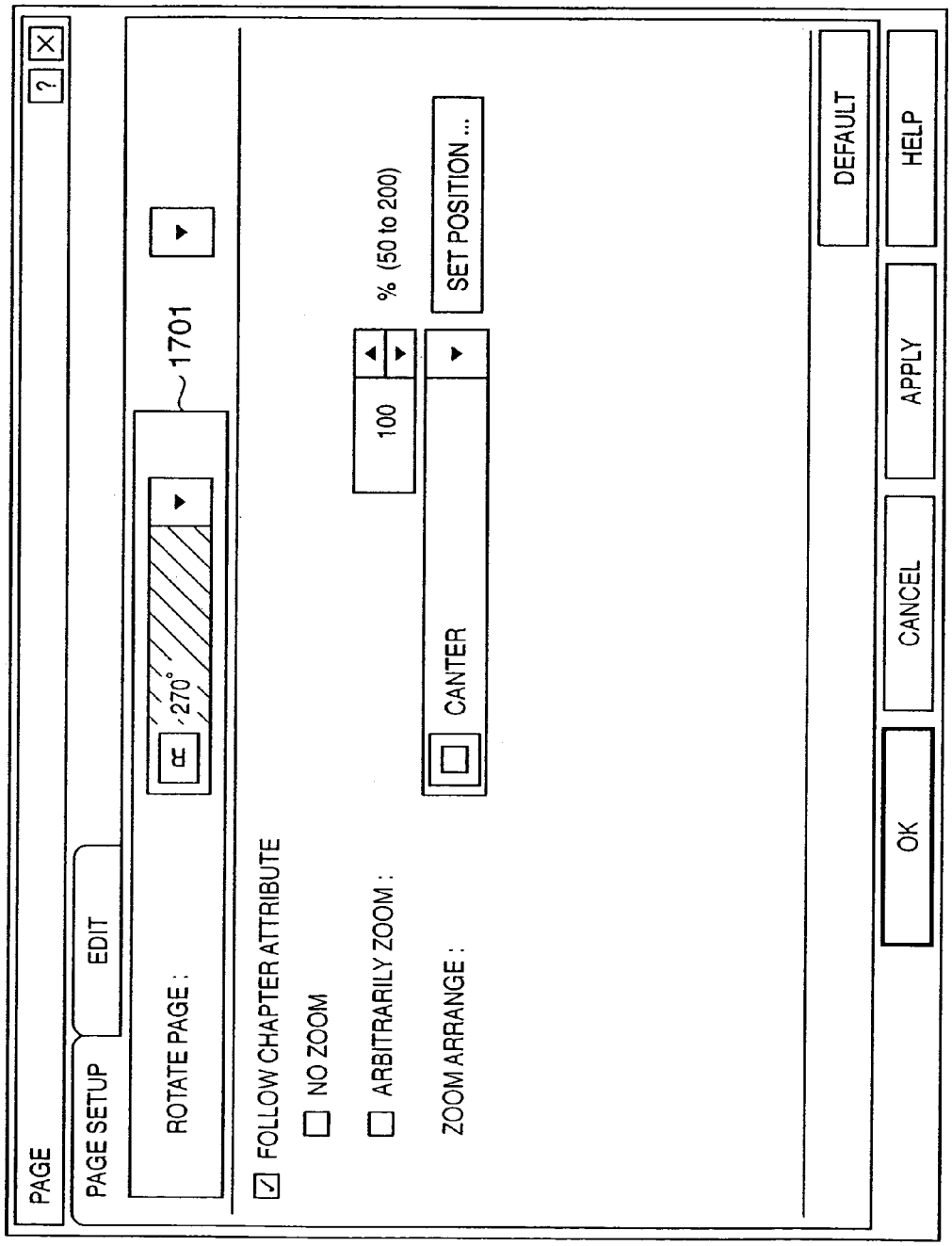
FIG. 18 is a view showing an example of changing a setting value in the dialog window of FIG. 17.

FIG. 17 shows a "Detailed Setting for Page" window 1700 of the bookbinding application 104. This window allows displaying/setting the "page setting information 411". This window is activated from the "Detailed Setting for Page" menu of the Print Form menu in the application operation window of FIG. 9 or a "Detailed Setting for Page" button on the tool bar. The "Detailed Setting for Page" window is a window for setting attributes unique to each page. This window is formed from two sheets Page Setup and Edit. FIG. 17 shows a state in which the Page Setup sheet is displayed. In the page setup sheet, settings mainly concerning a layout unique to each page can be done, and settings such as the rotation angle and enlargement/reduction ratio in laying out an original page can be designated. A "Follow Chapter Attribute" check box control 1701 is arranged for repetitive setting items between "Detailed Setting for Chapter" and "Detailed Setting for Page". For an item whose check box is checked, the setting value of the chapter is applied to the page. FIG. 18 shows a case wherein the check box is not checked.

FIG. 18 shows a state in which Page Rotation setting is changed in "Detailed Setting for Page" of FIG. 17. The control 1701 exhibits a setting of rotating and arranging an original page with the upper portion of the page oriented left in laying out the original page. Since this item is not provided with any "Follow Chapter Attribute" check box and is not a repetitive setting item in the chapter and document, the setting displayed in this window is always adopted as the setting value of the page. When the control 1701 is set, the "Zoom Arrange" item is a repetitive setting item in the chapter, and the setting value of the chapter is used as that of the page. When "Follow Document Attribute" is checked in the "Zoom Arrange" item of the chapter, the setting value of the document in the upper layer is used as that of the chapter, and thus the setting value of the document is used as that of the page. When the "Zoom Arrange" item is not checked in the chapter, the chapter has a unique setting value, and the setting value unique to the chapter is used as the setting value of the page.

Check box control information set in the setting window may be held in a dedicated region, but is desirably held as one attribute in the setting information shown in FIG. 3. In this case, regions for holding check box control information are added to the lists of FIGS. 5 and 6.

Figure 19:
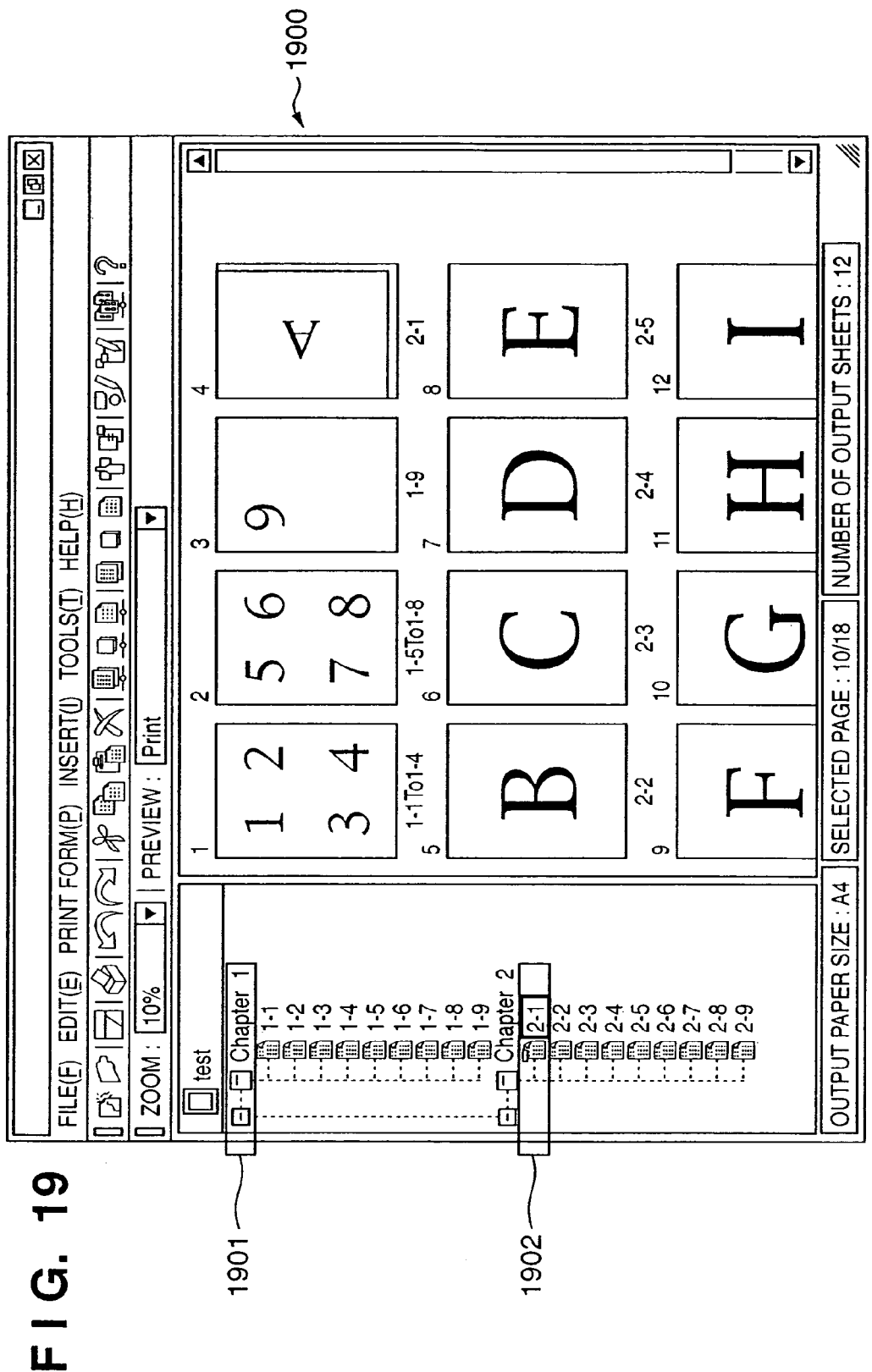
FIG. 19 is a view showing an example of display when settings unique to a chapter and page are done.

Example of Document Editing Display of Document Processing System According to Embodiment FIG. 19 shows an example of the display format of the application when a setting item which is repeated in an upper layer does not use a setting value in the upper layer, i.e., when the check box control 1501 or 1701 is not checked.

In the example of FIG. 19, a document is formed from two chapters, and each chapter has original data of nine pages. FIG. 19 shows a display example when the layout of the first chapter is 4UP (to be also referred to as 4in1 hereinafter) and rotation is designated for the first page (10th page in the whole document) of the second chapter. In the right preview, four original pages are laid out on each of the first to third pages. On the fourth page, a character "A" is rotated. A display format for settings unique to a chapter and page at a tree view will be explained. An icon 1901 corresponding to the first chapter changes to exhibit that this chapter has a unique setting. An icon 1902 corresponding to the first page of the second chapter also changes to exhibit that this page has a special setting.

Loading Method of Document Processing Apparatus According to Embodiment

As a method of loading a document as an electronic original to the bookbinding application 104 serving as the document processing apparatus, there has already been proposed a method of converting a document (also including an image file) generated by an arbitrary application in a host computer into an electronic original format by using an electronic original writer, as described above. The present invention provides a function of loading, as an electronic original (book file) to be processed by the bookbinding application 104, an image file read by an image reading apparatus (single scanner or a multifunction apparatus having an input/output function) which is connected to a host computer via a bidirectional interface and comprises a scanner. A loading method of converting an image file read from a paper original into a book file will be explained.

As described above, the method of receiving by a host computer an image file read by a scanner includes pull scan and push scan. In pull scan, the bookbinding application 104 transmits a scan instruction to the image reading apparatus via the scanner driver, and acquires an image file as a response. Pull scan is a well-known technique, and a detailed description thereof will be omitted. The acquired image file is generated as a book file by using the electronic original writer, and loaded as a new chapter by using a chaptering function (to be described later). In push scan, the operator designates the address (path to a predetermined folder in the HD of a host computer on a network) of the transmission destination of a read image via the operation panel of an image reading apparatus serving as a multifunction apparatus having an input/output function. The read image file is then transmitted to the designated address of the transmission destination. Push scan is also a well-known technique, and a detailed description thereof will be omitted. In loading an electronic original by push scan, a predetermined folder serving as the transmission destination of an image file by push scan is periodically monitored by the host computer. When the host computer detects that an image file has been transmitted to the predetermined folder, the image file is transferred to the electronic original writer, generated as a book file, and loaded as a new chapter by using the chaptering function (to be described later).

In this manner, an image file read by the image reading apparatus can be loaded as a book file into the bookbinding application 104. A chaptering method used to load an image file read by the image reading apparatus as a book file into the bookbinding application 104 will be described as a feature of the present invention. In particular, a method of converting an original containing single-sided printed paper original parts and double-sided printed paper original parts into a book file will be explained.

Document Processing Method for Original Containing Single- and Double-Sided Printed Parts According to Embodiment An original containing single- and double-sided printed parts is set on the ADF (Automatic Document Feeder) of the scanner of the image reading apparatus, and the entire original undergoes double-sided scanning without sorting single- and double-sided printed parts. A read instruction may be pull scan or push scan. By this operation, single-sided printed parts are electronized into an image file which contains scan data of lower blank surfaces. FIG. 20 shows this state. For illustrative convenience, FIG. 20 shows an example of an original containing three single-sided printed sheets and two double-sided printed sheets. The original in FIG. 20 is formed from a total of five sheets, and the five sheets undergo double-sided scanning. Scanned images correspond to 10 pages and include three blank images corresponding to the lower surfaces of the single-sided printed sheets.

By pull scan or push scan, an obtained image file is imported as an electronic original to the bookbinding application 104 to generate a book file, as described above. According to pull scan, the scanner driver loads an image file into the bookbinding application 104 via the electronic original writer. According to the push scan, a program which monitors a folder loads an image file into the bookbinding application 104 via the electronic original writer. Control of chaptering a loaded book file in a proper unit by the bookbinding application 104 will be explained with reference to the flowchart of FIG. 21. This sequence is executed by designating from the menu of a user interface window in FIG. 8 or the like a message to activate the bookbinding application 104 and import an original from the scanner.

In step S2101, the bookbinding application 104 loads the first two pages (upper and lower surfaces) of unprocessed images. In step S2102, the bookbinding application 104 determines whether the first page (upper surface) of the loaded image is blank. If the first page is not blank, the bookbinding application 104 determines in step S2103 whether the second page (lower surface) is blank. If the second page is determined to be blank, the current printed part can be determined to be a single-sided printed part. In step S2105, whether the print setting of the current chapter is "single-sided printing" is determined by referring to the "printing method" (chapter setting information 407 in FIG. 3 or column 1 of the chapter attribute shown in FIG. 5) attribute of a chapter (to be referred to as a current chapter) from which the current image is imported. If the print setting is determined to be single-sided printing, the printing method (single-sided printing) of the loaded original image coincides with the printing method attribute (single-sided printing) of the current chapter. In step S2107, the image of the first page (upper surface) is imported as a new page to the current chapter.

An operation to the editing information file in step S2107 will be explained with reference to the example of FIG. 3. When the print setting of the chapter setting information 407 of the current chapter 405 is single-sided printing, an imported image is added as new page data to the page data list 413, and a link to the new page data is added to the page link of the page information list 408 of the current chapter information 405. This page link links the page data of the imported image to the current chapter information 405.

To the contrary, a job ticket as an intermediate file has a hierarchical structure, but no chapter structure, unlike an editing information file. The job ticket has a structure in which a bundle of common paper sheets (also called sheets) is grouped by the sheet information 1102, and a bundle of partial paper sheets having a common surface setting (e.g., double-sided printing or single-sided printing) in the bundle of common paper sheets is grouped by the surface information 1103. For example, when one document contains different paper sizes, sheet information for each size is contained. For one paper size or paper quality, one sheet information suffices even with different printing methods. In the embodiment, since original images loaded at once by using the ADF function of the scanner have a constant size, only one sheet information corresponding to the first page suffices to be created for the sheet information 1102. In the embodiment, therefore, a job ticket layer corresponding to the "chapter" of the editing information file is "surface information" because the paper setting is kept unchanged in the embodiment. If the paper setting such as the paper size changes between chapters, the job ticket layer corresponding to the chapter is sheet information. In this manner, the layer corresponding to the chapter in the job ticket is determined in accordance with the type of attribute which changes between chapters in the editing information file. In the embodiment, the job ticket is processed in step S2107 in the example of FIG. 12 as follows. New physical page information 1104 to be linked to the surface information 1103 corresponding to the current chapter is added, and new original page information 1105 to be linked to the physical page information 1104 is added. Imported image data is linked as new page data to the page data link of the original page information 1105.

If the printing method attribute of the current chapter is determined in step S2105 not to be single-sided printing, the printing method (single-sided printing) of the loaded original image does not coincide with the printing method attribute (double-sided printing) of the current chapter. In step S2106, a new chapter is created and added to a book. The added chapter is set as a new current chapter, and its printing method attribute is set to single-sided printing.

An operation to the editing information file in step S2106 will be described with reference to FIG. 3. A link to a new chapter is added to the chapter information list 404 of the document information 401, and new chapter information is created and linked by the link. The printing method attribute of chapter setting information of the chapter is set to "single-sided printing". An operation to the job ticket in step S2106 will be described with reference to FIG. 12. Surface information 1103 corresponding to a new chapter is created and linked to the same sheet information 1102 as that of surface information corresponding to the current chapter. The new surface information 1103 is set as surface information 1103 corresponding to the current chapter. The printing method of the surface setting of the new surface information 1103 corresponding to the current chapter is set to "single-sided printing".

In step S2107, the loaded image data is imported to the newly created current chapter. If no chapter is determined in step S2105 to have been created in the book (no current chapter exists), the flow branches to step S2106 to create a new chapter and import loaded image data to the chapter. Also in this case, the printing method attribute (single-sided printing) of a loaded original image and the printing method attribute (none) of the current chapter can be considered not to coincide with each other. The loaded original image and given attribute are saved as part of a book file by the import process.

If the first page is determined in step S2102 to be blank, whether the second page, i.e., lower surface is also blank is determined in step S2104. If the second page is determined in step S2104 not to be blank, or the second page is determined in step S2103 not to be blank, the second page, i.e., lower surface of the loaded sheet is not blank. In this case, the loaded first and second pages are regarded to form one sheet of a double-sided printed part. In step S2109, the print setting of the current chapter is determined. If the printing method attribute of the current chapter is "double-sided printing", the printing method (double-sided printing) of the loaded original image coincides with the printing method attribute (double-sided printing) of the current chapter. In step S2111, the images of the first page (upper surface) and second page (lower surface) are imported to the current chapter.

If the printing method attribute of the current chapter is determined in step S2109 not to be double-sided printing, a new chapter is created in step S2110, the printing method attribute is set to double-sided printing, and the newly created chapter is set as the current chapter. In step S2111, the read image data is imported as new page data to the newly created current chapter. These processes are the same as those in steps S2106 and S2107 except the difference in printing method attribute and the number of pages to be imported. In step S2111, the number of pages to be imported is two. If a chapter is determined in step S2109 not to have been created in a book yet (no current chapter exists), the flow branches to step S2110 to create a new chapter and import read image data to the chapter.

If the second page (lower surface) is determined in step S2104 to be blank, the two surfaces are blank and are not imported to a book file. In this case, the two blank pages loaded in step S2101 are discarded.

In step S2108, the images of the two pages loaded in step S2101 are set as processed images. In step S2112, whether an unprocessed image exists is determined, and if YES, the flow returns to step S2101 to perform an import process for the images of the next two pages. Note that no special process need be performed in step S2108 if new data is written in step S2101 over image data of two immediately loaded pages. When, for example, image data in process is indicated with a pointer or the like, the pointer is moved to new image data in step S2108. When an attribute representing "valid/invalid" is assigned to image data, the attribute is changed to "invalid".

In this manner, the images of two pages, i.e., the scanned images of the upper and lower surfaces of one sheet are sequentially loaded in steps S2101 to S2112. When the current sheet is determined to be a single-sided printed part, the image of the upper surface is imported to a single-sided chapter; when the current sheet is determined to be a double-sided printed part, the images of the two surfaces are imported to a double-sided chapter. Accordingly, an original state in which single- and double-sided printed parts coexist can be recorded in a book file. In addition, the state of the original can be recorded without capturing any unnecessary blank image into a book file.

In the above example, when two surfaces are blank, their images are not captured into a book file. However, it is also possible to determine that an original sheet whose two surfaces are blank is a single-sided printed part, import the blank upper surface to a single-sided chapter, and copy even the original sheet whose two surfaces are blank as part of a document.

The chapter attribute shown in FIG. 5 can designate whether to change the printing method of a chapter to single-sided printing or a book attribute (double-sided printing) only when the printing method attribute of a book is double-sided printing. In executing the flow shown in FIG. 21, the printing method attribute of a book is set to double-sided printing. In this case, when the printing method attribute of each chapter is set to single-sided printing, single-sided printing is designated, and when the printing method attribute is set to double-sided printing, the book attribute is applied to the chapter (Follow Book Attribute=ON). With this setting, the single-/double-sided setting of each chapter can be reflected in the book attribute.

Figure 21:
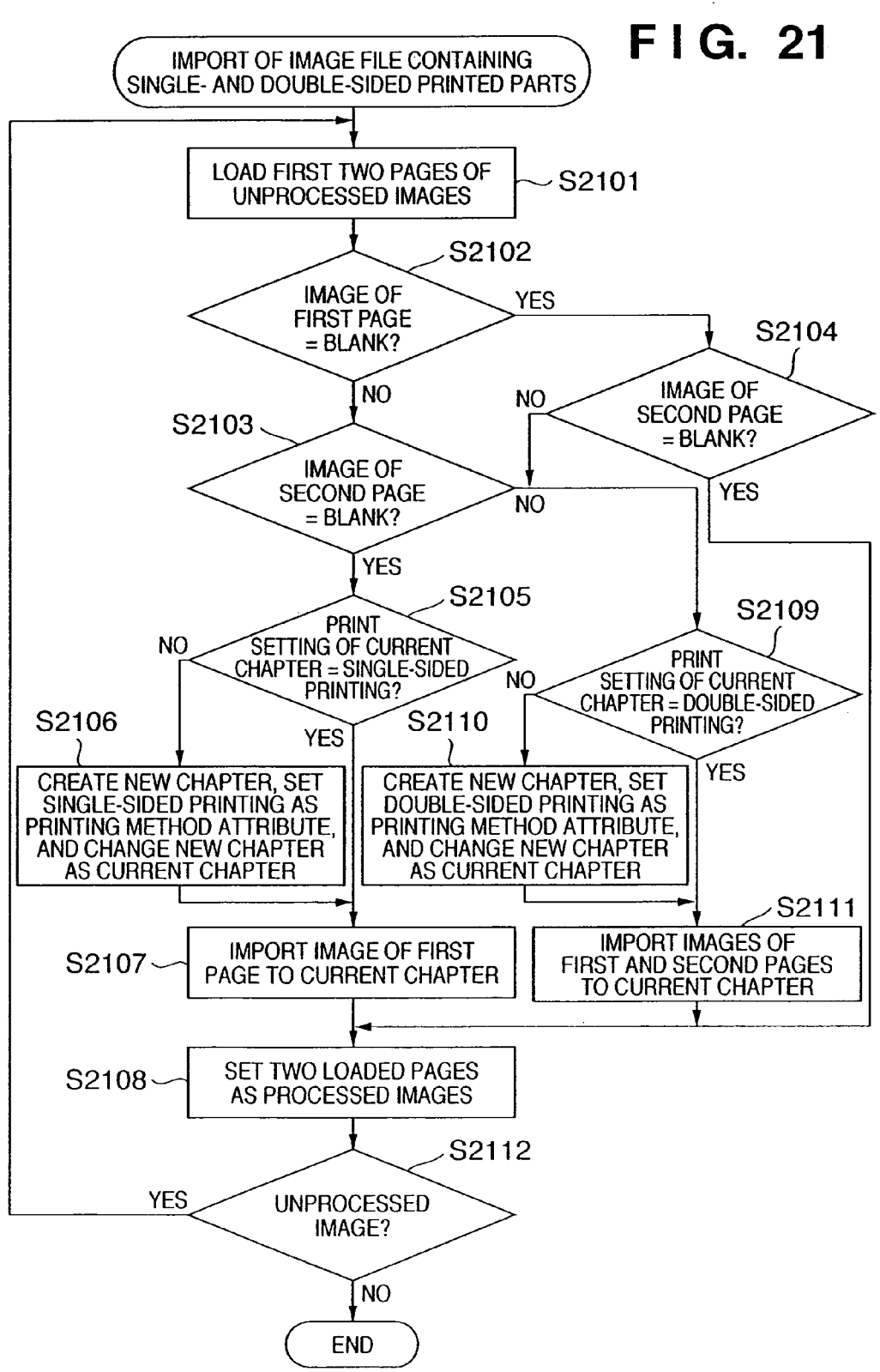
FIG. 21 is a flowchart showing a process sequence of importing an image file obtained by double-sided scanning as an electronic original to a bookbinding application 104 and generating a book file.
Figure 22:
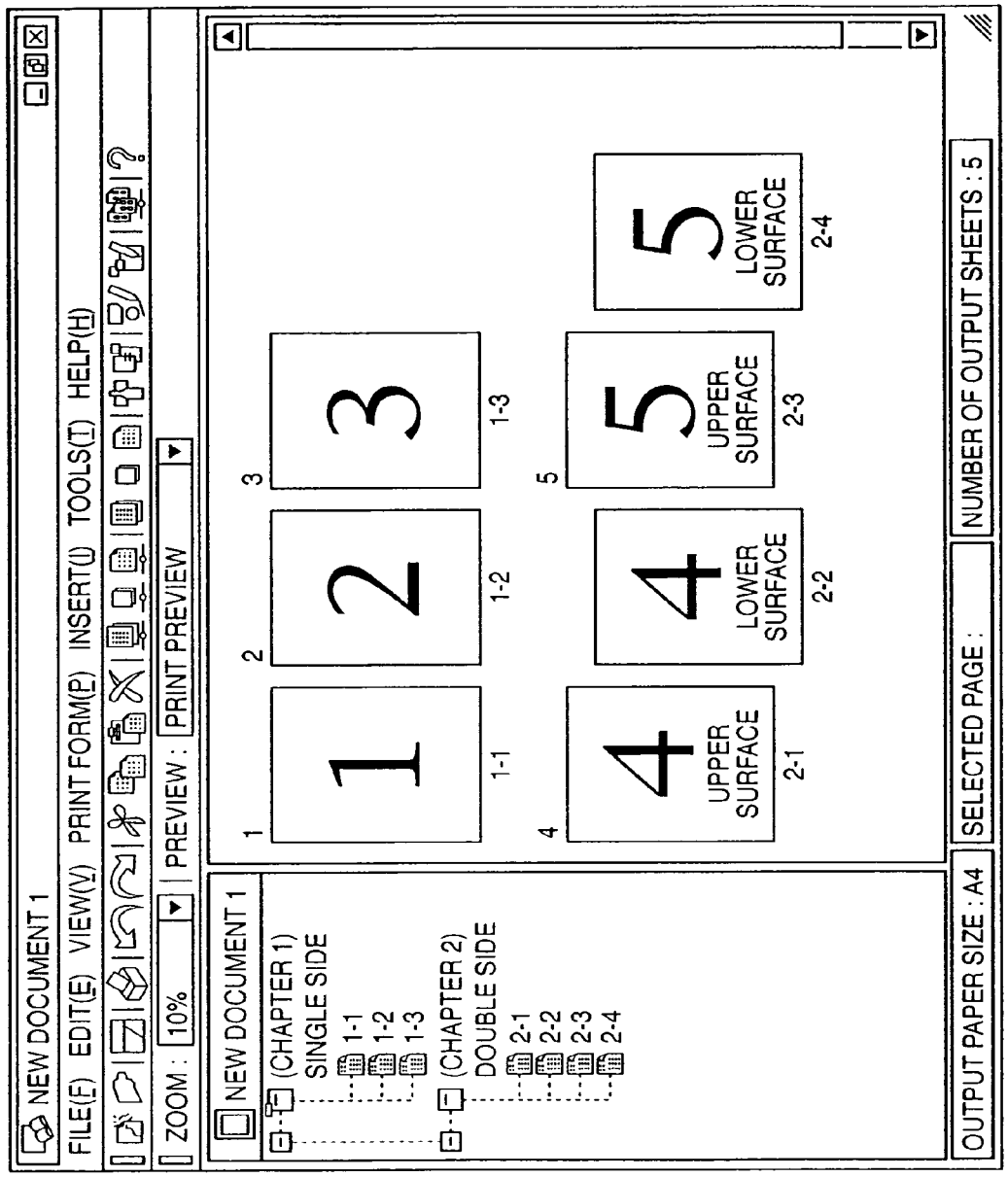
FIG. 22 is a view showing a state in which the image file containing the single- and double-sided printed parts shown in FIG. 20 is loaded into the bookbinding application 104 in accordance with the flowchart shown in FIG. 21.

FIG. 22 shows a state in which the image file containing single- and double-sided printed parts shown in FIG. 20 is captured into the bookbinding application 104 in accordance with the flowchart shown in FIG. 21. The scanned images of the upper surfaces of single-sided printed parts are captured into a chapter having the single-sided printing attribute, and the blank images of their lower surfaces are deleted. The scanned images of the two surfaces of each of double-sided printed parts are loaded into a chapter having the double-sided printing attribute. As a result, an original containing single- and double-sided printed parts can be reproduced.

When an original containing double- and single-sided printed parts is loaded into the bookbinding application, chaptering is desirably automatically done in accordance with user designation. Since the original loading method for a read image file includes pull scan and push scan, as described above, designation of automatic chaptering changes depending on the loading method.

Figure 31:
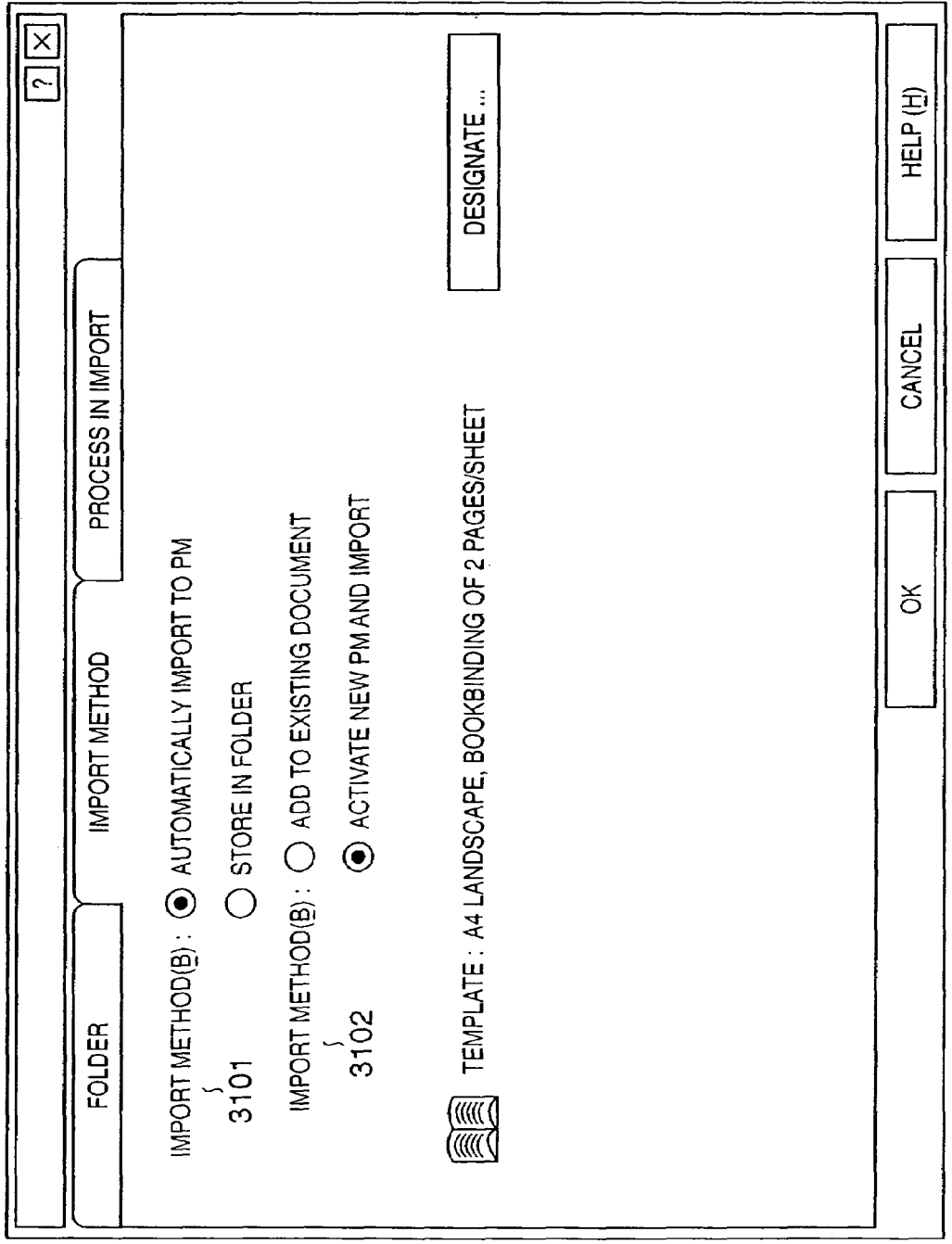
FIG. 31 is a UI view showing an example of a dialog box for setting an import method for an image file to be loaded into a folder.

FIG. 31 is a UI view showing an example of a dialog box for setting an import method for an image file to be loaded into the transmission destination folder of scanned image files in the use of push scan. This dialog can be displayed and set by selecting, e.g., an "import" item on the "print setting" column of the menu in FIG. 22. In FIG. 31, an import method 3101 allows the user to select whether to import scanned image data to a book file by the bookbinding application (represented by PM in FIG. 31) or store it in the folder. Although not shown in FIG. 31, when scanned image data is to be stored in the folder, the folder can also be designated. When import to the book file is designated, image data of two pages are captured from the scanner in step S2101 of FIG. 21. When storage in the folder is designated, image data of two pages are captured from a predetermined folder in step S2101 of FIG. 21.

An import method 3102 allows the user to select whether to add scanned image data to an existing document (i.e., book file) or create a new book file. When scanned image data is to be added to an existing document, the document to which the scanned image data is to be added can be designated. When addition of image data to be imported to an existing document is designated, an existing book file is designated and opened prior to the sequence of FIG. 21, and then the process of FIG. 21 is executed for the book file. When setting of image data to be imported as a new document is designated, a new book file is created prior to the sequence of FIG. 21, and then the process of FIG. 21 is executed for the new book file.

When a new book file is to be created, the print setting can also be designated. In FIG. 31, bookbinding printing on an A4 paper in the landscape direction is designated. As for designated items, values corresponding to the designation are stored in a predetermined storage area and referred to in an import process.

According to the embodiment, an original containing double- and single-sided printed parts is read as a double-sided printed original by the scanner, and whether each image data corresponds to a double- or single-sided printed part is determined. Single-sided original parts and double-sided original parts can be captured as different chapters into a document. Since single- and double-sided original parts can be read by the scanner without discriminating them, the labor of the operator can be reduced to improve the operability and productivity. At the same time, the printing method of a single-sided original part can also be managed as single-sided printing even in an electronic document. A single-sided original part does not undergo double-sided printing, wasteful consumption of the printing apparatus can be prevented, and the printing cost can be reduced.

Figure 23:
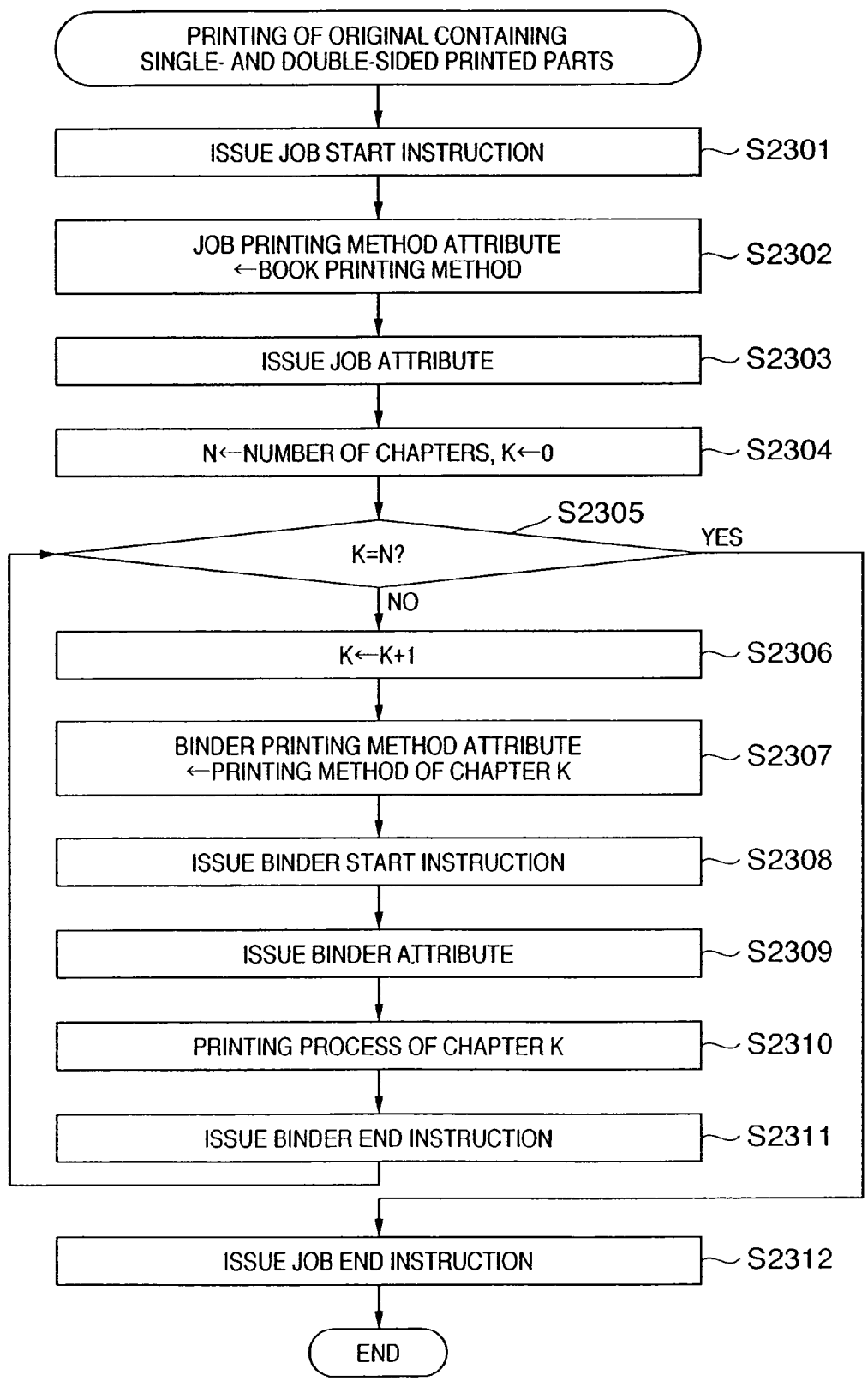
FIG. 23 is a flowchart showing a detailed sequence of a printing process in an electronic original despooler 105.

Printing Control Method for Original Containing Single- and Double-Sided Printed Parts According to Embodiment FIG. 23 is a flowchart showing details of a printing process in the electronic original despooler 105. A printing apparatus such as a printer to which the present invention can be applied has a hierarchical structure of a job, binder, and page, similar to a hierarchical structure of a book, chapter, and page in a book file. Control of a printing apparatus complying with the print setting of a document having a hierarchical structure can be implemented by applying book settings to a job in the printing apparatus and chapter settings to a binder in the printing apparatus.

In step S2301, the electronic original despooler 105 issues a job start instruction. In step S2302, the electronic original despooler 105 sets a book printing method (single- or double-sided printing) to the printing method attribute of the job. Although the book printing method also includes book-binding printing as a choice, the embodiment will explain single-/double-sided printing control and a description of bookbinding printing will be omitted. In practice, the printing method is also set as a binder attribute in step S2309, and the book printing method setting is not significant in this case. In some cases, double-sided printing must be designated as the book printing method, similar to the above example in which only when the book printing method attribute is double-sided printing, single-/double-sided printing (similar to a book) can be set as a chapter printing method. The embodiment can control the printing method in either case by directly setting the book printing method attribute as the job printing method attribute.

The electronic original despooler 105 issues job attributes containing the printing method in step S2303, and initializes a chapter number in process in step S2304. In step S2305, the electronic original despooler 105 determines whether all chapters have been processed, and if YES, issues a job end instruction in step S2312 to end the book printing process. If an unprocessed chapter remains, the electronic original despooler 105 advances the chapter to be processed by one in step S2306, and sequentially executes the processes for all chapters in steps S2307 to S2311. In step S2307, the electronic original despooler 105 issues a binder start instruction, and sets the printing method of the current chapter in process as the binder printing method attribute. In step S2309, the electronic original despooler 105 issues binder attributes including the printing method. In step S2310, the electronic original despooler 105 executes a printing process for each page of the chapter in process. After the end of the printing process within the chapter, the electronic original despooler 105 issues a binder end instruction in step S2311, and returns to step S2305 to repeat the process until all chapters are processed. The printer driver generates print data on the basis of an issued instruction, and the single-/double-sided printing settings of all the chapters can be transmitted to the printer.

Figure 24:
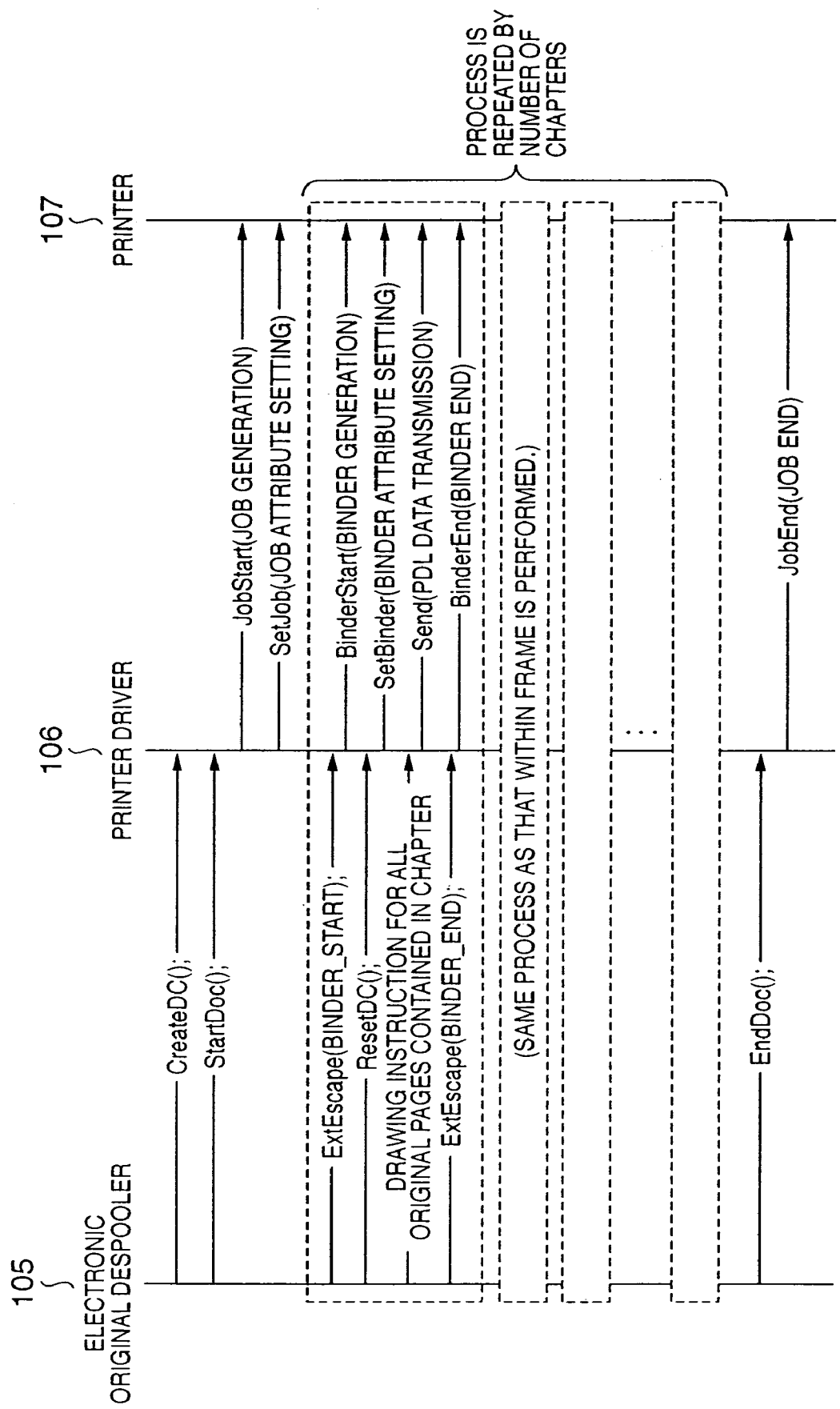
FIG. 24 is a sequence view showing a printing process sequence between the electronic original despooler 105, a printer driver 106, and a printer 107.

FIG. 24 is a sequence view showing how to control the printing process in FIG. 23 between the electronic original despooler 105, the printer driver 106, and the printer 107.

In steps S2304 and S2305 of FIG. 23, the electronic original despooler 105 executes a process of generating a print job, such as CreateDC( ) or StartDoc( ) for, e.g., Windows® OS in accordance with the printing process sequence of the OS. The printer driver 106 is notified of this process via the GDI, and performs a job generation process and job attribute setting process. More specifically, the printer driver 106 generates commands which instruct the printer on the start of the job and job attributes including the printing method setting, and transmits the commands to the printer 107 via an OS procedure for transmitting data to the printer.

The electronic original despooler 105 executes ExtEscape (BINDER_START) by the binder start issuing process in step S2307 of FIG. 23, and notifies the printer driver 106 of the start of a binder which allows designating an independent finishing attribute. This process means notification of the start of printing a chapter. The electronic original despooler 105 executes ResetDC( ) by the binder attribute issuing process in step S2309 of FIG. 23, and notifies the printer driver 106 of binder attributes. More specifically, the electronic original despooler 105 notifies the printer driver 106 of binder attributes including the stapling setting of a chapter. The printer driver 106 receives these processes, and performs a binder generation process and binder attribute setting process which notify the printer 107 of the start of a binder. More specifically, the printer driver 106 generates commands which instruct the printer on binder attributes including the printing method setting, and transmits the commands to the printer 107 via an OS procedure for transmitting data to the printer.

By the process in step S2310 of FIG. 23, the electronic original despooler 105 notifies the printer driver 106 via the GDI of the drawing contents of each page contained in the binder, i.e., the drawing contents of each original page contained in the current chapter. As described above, the printer driver 106 receives the drawing contents which are converted from GDI to DDI, converts them into a drawing instruction such as PDL interpretable by the printer, and transmits the instruction to the printer 107.

The electronic original despooler 105 notifies the printer driver 106 by ExtEscape(BINDER_END) and ExtEscape (BINDER_START) that the current binder ends in step S2311 of FIG. 23 and the next binder starts in step S2307. The purpose of these two notifications is to notify the printer driver 106 of the boundary between binders, and they can be combined into one notification which notifies the printer driver 106 of the boundary between binders.

The electronic original despooler 105 repeats the above process by the number of chapters. Finally, the electronic original despooler 105 executes a process of ending the print job, such as EndDoc( ) for, e.g., Windows® OS in accordance with the printing process sequence of the OS in step S2312 of FIG. 23. The printer driver 106 is notified of this process via the GDI, and performs a job end process. More specifically, the printer driver 106 generates a command which instructs the printer to end the job, and transmits the command to the printer 107 via an OS procedure for transmitting data to the printer.

Note that a concrete API such as ExtEscape( ) or ResetDC( ) has been exemplified as a means for transmitting a notification from the electronic original despooler 105 to the printer driver 106 via the GDI. However, the same process can also be implemented by using a means other than the API as far as the printing process can be executed by the electronic original despooler 105 and printer driver 106 in synchronism with each other.

By the above process, the printing method (single-/double-sided printing) set for each chapter of a book file is issued as a binder attribute to the printer, and printing can be done while single-sided printing and double-sided printing are switched. The binder attribute can also successively set single-/double-sided printing. When a binder having the double-sided printing attribute has an odd number of pages, no data is printed on the lower surface of the final sheet. By ending the binder without issuing any print instruction for the lower surface after a print instruction for the upper surface, the printer 107 can recognize that single-sided printing is performed for this sheet.

As described above, the document processing system for a printed material containing single- and double-sided printed parts according to the embodiment executes double-sided scanning for the entire printed material containing single- and double-sided printed parts. The document processing system can omit sorting of single- and double-sided printed parts. In capturing a created image into a book file, the single-/double-sided attribute of the original is saved as a chapter attribute. In printing, single-sided printing and double-sided printing are switched similar to the original, so that unwanted charging can be prevented.

Embodiment (2)

Figure 26B:
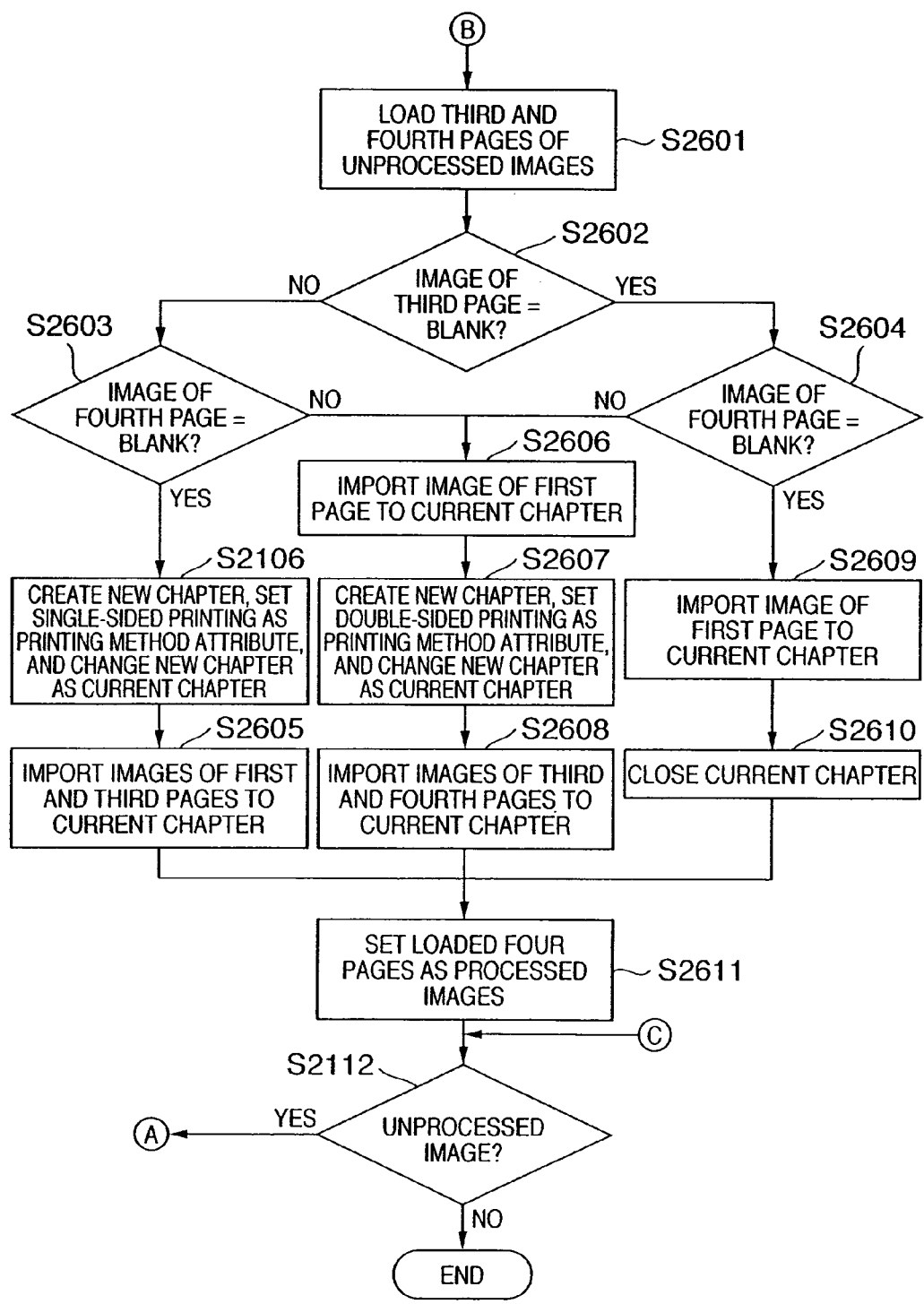

An original is chaptered in accordance with the difference in printing method in the above embodiment, but can also be chaptered by a blank sheet inserted into the original. In embodiment (2), a process sequence in FIGS. 26A and 26B is executed in place of the process in FIG. 21. The operator can set process conditions via user interfaces shown in FIGS. 32 and 33. As for designated items, values corresponding to the designation are stored in a predetermined storage area and referred to in an import process.

FIG. 32 is a UI view showing an example of a menu bar for setting automatic chaptering for a book file loaded into a bookbinding application in the use of pull scan. FIG. 32 illustrates the same window as that of FIG. 31, and input is permitted by selecting a "process in import" tab. In FIG. 32, when a "delete blank sheet" check box 3201 is checked, a blank sheet delete flag in a predetermined storage area is set. In embodiment (2), when the blank sheet delete flag is set and two surfaces are blank, these two pages are discarded. In FIG. 21 and FIGS. 26A and 26B (to be described later), the process is done on the assumption that the blank sheet delete flag is set. In order to reflect the blank sheet delete flag in FIGS. 21, 26A and 26B, even if upper and lower surfaces are determined to be blank pages, one blank page in case of single-sided printing for the current chapter or two blank pages in case of double-sided printing are inserted into the current chapter without discarding the blank pages. If a "successive blank sheets are not deleted" check box 3202 is designated, a corresponding flag is set. As far as this flag is set, even if a plurality of blank sheets are successive, they are directly imported into a book file. If the blank sheet delete flag is set and the check box 3202 is not checked, for example, only one blank sheet is imported.

If a "chaptering" check box 3203 is checked, a chaptering flag is set. If the chaptering flag is not set, all imported original images are inserted as one chapter without performing the processes in FIGS. 21, 26A and 26B.

If the chaptering flag is set, a chaptering method button 3204 can be selected. As the chaptering method, a setting of dividing a chapter by a blank page and a method of dividing a chapter in accordance with switching between single-sided printing and double-sided printing of an original can be selected. These two methods may also be simultaneously adopted. When chaptering is selected, an "apply double-/single-sided setting after chaptering" check box 3205 and an "apply a single-sided page succeeding to double-sided pages as the final page of a double-sided chapter" check box 3206 can be selected. If the "apply double-/single-sided setting after chaptering" check box 3205 is checked, a proper printing method is set for a divided chapter after the chapter is divided. If the "apply a single-sided page succeeding to double-sided pages as the final page of a double-sided chapter" check box 3206 is checked, the chapter is divided by using, as the final page of a double-sided original, one single-sided printed page succeeding to the double-sided printed original. When only one single-sided printed original sheet is inserted in a double-sided original part, it is natural to consider that the single-sided original sheet is the final page of the double-sided printed original, and a new double-sided printed original follows the single-sided original sheet. When the check box 3206 is checked in this case, the chapter is divided by the single-sided original sheet used as a final page. The process in FIGS. 26A and 26B (to be described later) is executed when the check box 3203 is checked, the "divide chapter between single-sided page and double-sided page" button is selected, and both the check boxes 3205 and 3206 are checked.

Figure 33:
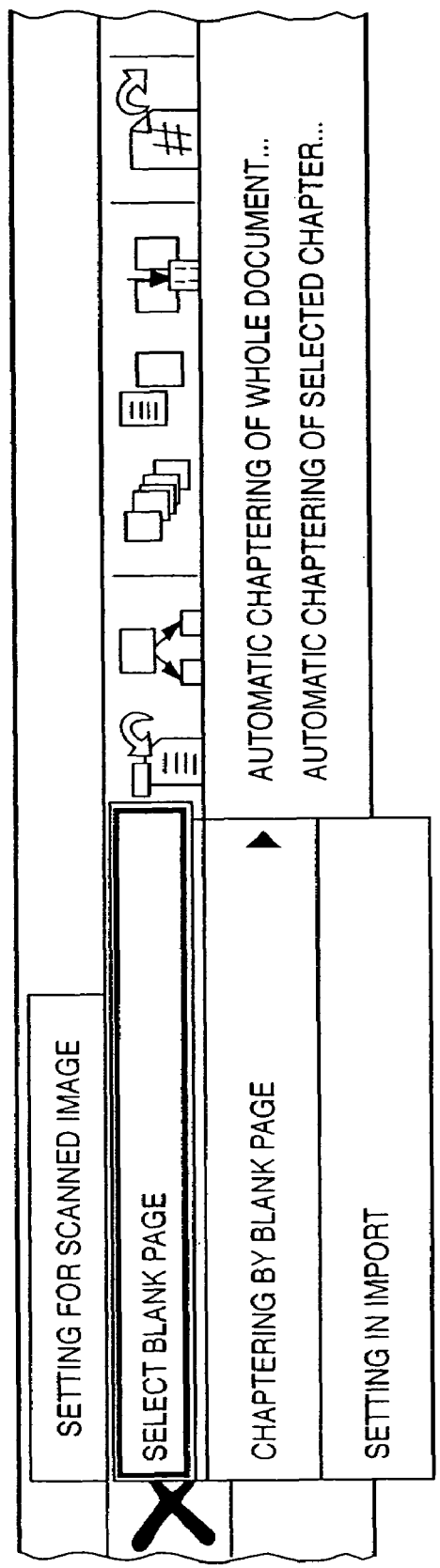
FIG. 33 is a UI view showing an example of a menu bar for setting automatic chaptering for a book file loaded into the bookbinding application.

FIG. 34 is a UI view showing an example of a dialog box for detailed setting for automatic chaptering. Automatic chaptering is performed for a book file by selecting an existing book file and designating application of automatic chaptering by the operator. The meanings of check boxes are the same as those shown in FIG. 32 except that settings in FIG. 32 are done in import. FIG. 33 shows a menu window for displaying the user interface window of FIG. 34. This menu window enables designating which of an entire document or selected chapter undergoes chaptering. If the "chaptering" check box 3203 in FIG. 32 is not checked in import but chaptering is done after the completion of import, a chapter can be divided at the switching portion between double-sided printing and single-sided printing or a portion at which a blank sheet is inserted.

According to the present invention, a loaded original can be chaptered in accordance with user settings designated in FIG. 31, 32, or 34 by automatically determining double-sided printing and single-sided printing.

A process sequence when the "delete blank sheet" check box 3201, "chaptering" check box 3203, "apply double-/single-sided setting after chaptering" check box 3205, and "apply a single-sided page succeeding to double-sided pages as the final page of a double-sided chapter" check box 3206 in the settings of FIG. 32 are checked and a "divide chapter between single-sided page and double-sided page" option is designated as the chaptering method 3203 will be explained with reference to FIGS. 26A and 26B.

FIG. 25 shows an example of a scanned original. The original shown in FIG. 25 is formed from a total of six sheets, and the six sheets undergo double-sided scanning. Scanned images correspond to 12 pages and include two blank images corresponding to the final pages of double-sided printed parts.

FIGS. 26A and 26B show flowcharts of importing an obtained image file as an electronic original to a bookbinding application 104, and generating a book file. The flowcharts of FIGS. 26A and 26B are the extension of that of FIG. 21. The flow is changed in a case branching from step S2105 to step S2106. The same reference numerals as in FIG. 21 denote the same steps.

In step S2101, the bookbinding application 104 loads the first two pages (upper and lower surfaces) of unprocessed images. In step S2102, the bookbinding application 104 determines whether the first page (upper surface) of the loaded image is blank. If the first page is not blank, the bookbinding application 104 determines in step S2103 whether the second page (lower surface) is blank. If the second page is determined to be blank, the current printed part can be determined to be a single-sided printed part. In step S2105, whether the print setting of the current chapter is "single-sided printing" is determined by referring to the "printing method" (chapter setting information 407 in FIG. 3 or column 1 of the chapter attribute shown in FIG. 5) attribute of the current chapter from which the current image is imported. If the print setting is determined to be single-sided printing, the printing method (single-sided printing) of the loaded original image coincides with the printing method attribute (single-sided printing) of the current chapter. In step S2107, the image of the first page (upper surface) is imported as a new page to the current chapter. Note that import of a page to an editing information file or job ticket and creation of a chapter are the same as those described with reference to FIG. 21.

If the printing method attribute of the current chapter is determined in step S2105 not to be single-sided printing, the printing method (single-sided printing) of the loaded original image does not coincide with the printing method attribute (double-sided printing) of the current chapter. In step S2601, the bookbinding application 104 additionally loads two pages (third and fourth pages) of unprocessed images. In step S2602, the bookbinding application 104 determines whether the third page (upper surface) is blank. The bookbinding application 104 determines whether the fourth page (lower surface) is blank in step S2603 if the third page is blank, and S2604 if the third page is not blank.

If only the fourth page is determined to be blank, the additionally loaded sheet is a single-sided printed sheet, and thus two single-sided printed original sheets are successive. In this case, it is determined that the double-sided original part is switched to a single-sided original part. In step S2106, a chapter is newly created, the new chapter is set as the current chapter, and the printing method attribute is set to single-sided printing. In step S2605, images on the upper surfaces of the first and third pages, i.e., two sheets are imported to the current chapter.

If both the third and fourth pages are not blank, or only the fourth page is not blank, one single-sided original sheet is inserted in a double-sided original part. In this case, the first page is determined to be an odd-numbered page which happens to be the final page of the double-sided printed part. In step S2606, the first page is imported to the current chapter of double-sided printing. In step S2607, a chapter is newly created and set as the current chapter, and the printing method attribute is set to double-sided printing. In step S2608, the images of the third and fourth pages are imported to the current chapter.

If both the third and fourth pages are blank, the image of the first page is imported to the current chapter of double-sided printing in step S2609, and the current chapter is closed in step S2610. In determining the single-/double-sided printing attribute of the current chapter in step S2105 or S2109, the same process as that executed when no chapter has been created in a book yet is performed. In other words, a new chapter of single- or double-sided printing is always created when the next image is processed.

In this manner, the images of two sheets, i.e., four pages having undergone double-sided scanning are processed. In step S2611, these four pages are set as processed images. In step S2112, whether an unprocessed image remains is determined, and the process is repetitively performed from step S2101 until all images are processed.

If the first page is determined in step S2102 to be blank, whether the second page, i.e., lower surface is also blank is determined in step S2104. If the second page is determined in step S2104 not to be blank, or the second page is determined in step S2103 not to be blank, the second page, i.e., lower surface of the loaded sheet is not blank. In this case, the loaded first and second pages are regarded to form one sheet of a double-sided printed part. In step S2109, the print setting of the current chapter is determined. If the printing method attribute of the current chapter is "double-sided printing", the printing method (double-sided printing) of the loaded original image coincides with the printing method attribute (double-sided printing) of the current chapter. In step S2111, the images of the first page (upper surface) and second page (lower surface) are imported.

If the printing method attribute of the current chapter is determined in step S2109 not to be double-sided printing, a new chapter is created in step S2110, the printing method attribute is set to double-sided printing, and the newly created chapter is set as the current chapter. In step S2111, the loaded image data is imported as new page data to the newly created current chapter. These processes are the same as those in steps S2106 and S2107 except the difference in printing method attribute and the number of pages to be imported. In step S2111, the number of pages to be imported is two. If a chapter is determined in step S2109 not to have been created in a book yet (no current chapter exists), the flow branches to step S2110 to create a new chapter and import read image data to the chapter.

If the second page (lower surface) is determined in step S2104 to be blank, the two surfaces are blank and are not imported to a book file. In this case, the two blank pages loaded in step S2101 are discarded.

In step S2108, the images of the two pages loaded in step S2101 are set as processed images. In step S2112, whether an unprocessed image exists is determined, and if YES, the flow returns to step S2101 to perform an import process for the images of the next two pages. Note that no special process need be performed in step S2108 if new data is written in step S2101 over image data of two immediately loaded pages. When, for example, image data in process is indicated with a pointer or the like, the pointer is moved to new image data in step S2108. When an attribute representing "valid/invalid" is assigned to image data, the attribute is changed to "invalid".

In this fashion, the images of two or four pages, i.e., the scanned images of the upper and lower surfaces of one or two sheets are sequentially loaded in steps S2101 to S2112. When the current sheet is determined to be a single-sided printed part, the image of the upper surface is imported to a single-sided chapter; when the current sheet is determined to be a double-sided printed part, the images of the two surfaces are imported to a double-sided chapter. Even if the final lower surface is blank and only one single-sided printed sheet exists immediately after a double-sided printed part because the double-sided printed part is formed from an odd number of pages, the image of the single-sided printed sheet is imported to the immediately preceding double-sided chapter. As a result, an original state in which single- and double-sided printed parts coexist can be recorded in a book file. The state of the original can be recorded without capturing any unnecessary blank image into a book file. Moreover, a blank sheet at the end of a chapter having the double-sided printing setting is not recognized as a single-sided printed sheet, and can be recorded as a sheet of the double-sided chapter in a book file.

Figure 27:
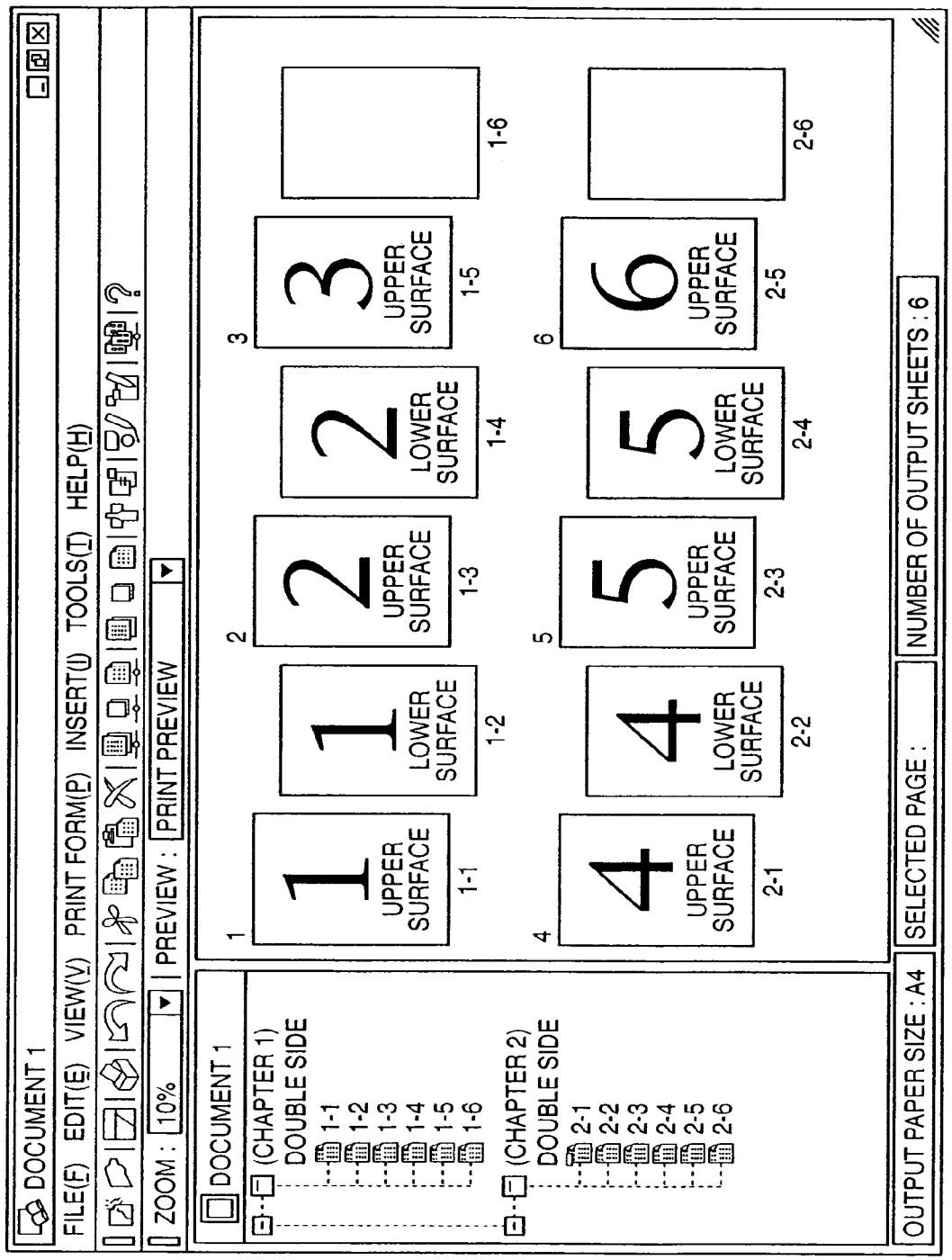
FIG. 27 is a view showing a state in which the image file obtained by scanning the double-sided printed part whose original shown in FIG. 25 has an odd number of pages is loaded into the bookbinding application 104 in accordance with the flowchart shown in FIGS. 26A and 26B.

FIG. 27 shows a state in which the image file shown in FIG. 25 is captured into the bookbinding application 104 in accordance with the flowcharts shown in FIGS. 26A and 26B. The double-sided scanned images of a double-sided printed part are grouped into a chapter having the double-sided printing attribute. When double-sided chapters are successive, a blank sheet at the end of a preceding or final chapter prevents erroneous recognition of the final page of each double-sided chapter as a single-sided printed part. Note that the book file printing sequence is the same as that shown in FIGS. 23 and 24 according to the first embodiment.

As described above, the document processing system of embodiment (2) can divide a chapter by using a single-sided original sheet inserted in a double-sided original part as the break of the double-sided original part. This can prevent division of a document into too many chapters.

If the second page is determined in step S2104 to be blank, the original sheet can be determined to be blank. In this case, the blank sheet is discarded in FIGS. 26A and 26B. Alternatively, the current chapter may be temporarily closed by using this blank sheet as a chapter break. The process in this case is the same as step S2610.

Embodiment (3)

Method of Notifying Single-Sided Scanning/Double-Sided Scanning/Single-Sided & Double-Sided Scanning from Scanner The document process according to the first and second embodiments assumes that an image file to be processed is obtained by double-sided scanning of an original containing single- and double-sided printed parts. When scanning (push scan) is executed on the scanner side or pull scan is executed from the host side, a bookbinding application 104 recognizes that an original containing single- and double-sided printed parts has been scanned, and executes the document process (FIGS. 21, 26A and 26B) only in double-sided scanning of a mixed original. This can generate a book file more faithfully to a paper original.

Figure 28:
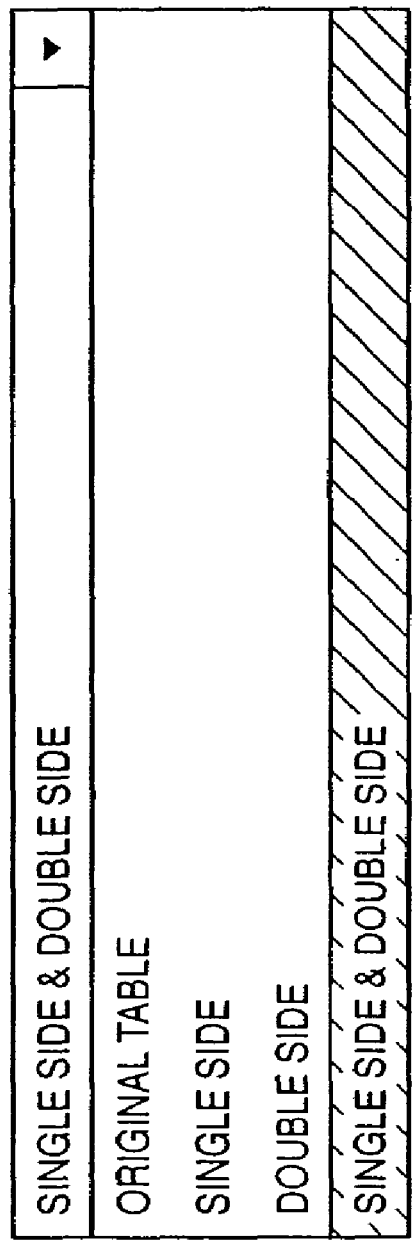
FIG. 28 is a view for explaining choices of the read method of a scanner.

FIG. 28 shows an example of choices of a read method that are displayed on the operation panel of a scanner 108 or the user interface of a scanner driver 109. The choices are "original table", "single side", "double side", and "single side & double side". FIG. 29 is a flowchart showing an image import process in the bookbinding application 104.

In pull scan described above, the bookbinding application 104 receives image data from the scanner 108 via the scanner driver 109. In FIG. 29, the bookbinding application 104 receives, together with a set of image data, information on a choice selected as the read method in FIG. 28 that is displayed on the user interface of the scanner driver (step S2901), and determines the selected read method (step S2902). Only if "single side & double side" is determined, the bookbinding application 104 divides a single-/double-sided original into single- and double-sided chapters in step S2903 in accordance with the flow of FIG. 21 or FIGS. 26A and 26B, and imports the chapters to a book file.

If "single side & double side" is determined not to be selected, the bookbinding application 104 determines that the read method is "double side" (step S2904). If the read method is determined to be "double side", the bookbinding application 104 newly creates one double-sided chapter (step S2906), and captures all images into the double-sided chapter (step S2907).

If the read method is "original table" or "single side", the bookbinding application 104 newly creates one single-sided chapter (step S2905), and captures all images into the single-sided chapter (step S2907).

Also in push scan described above, the bookbinding application 104 imports images to a book file by the same process as that in pull scan. In push scan, however, the scanner 108 may generate an image file without synchronizing with the bookbinding application 104. In this case, the read method can be acquired by the following method in step S2901.

According to the first method, the scanner 108 generates an image file in accordance with a naming convention shown in FIG. 30 on the basis of designation of the read method shown in FIG. 28. When "original table" or "single side" is selected, "S_" is added to the start of a file name, which means single-sided scanning. When "double side" is selected, "D_" is added, and when "single side & double side" is selected, "DS_" is added. Based on this file name, the bookbinding application 104 can determine the image read method of image data contained in a file having the file name.

The second method is to store a sign representing a method in an image file. Some image file formats or some file formats capable of storing images can store a comment area or the like. In this case, the read method can be recorded in the file to notify the bookbinding application 104 of the read method. This method can be applied to, e.g., Adobe PDF.

According to the third method, the scanner 108 changes the generation destination (storage destination) of an image file for each designation of the read method shown in FIG. 28. The scanner 108 changes the storage destination in accordance with a convention defined together with the bookbinding application 104 in advance, and the bookbinding application 104 can determine the read method.

With any of the first to third methods, the sequence of FIG. 29 can be applied to push scan, too. Note that the book file printing sequence is the same as that shown in FIGS. 23 and 24 according to the first embodiment.

As described above, the document processing system of embodiment (3) scans an original by designating single-sided scanning/double-sided scanning/single-sided & double-sided scanning, thereby eliminating unnecessary scanning (e.g., double-sided scanning for a single-sided original) and an unnecessary process (e.g., chaptering process at the break between a single-sided sheet and double-sided sheet in a single- or double-sided original part). Embodiment (3) can further increase the process efficiency of importing an original.

In the above embodiment, the term "load/loading" is used to describe "read/reading document data" or "offer/offering a original document to the document processing system". In the later case, the term "distribute/distributing" may be used instead of using "load/loading".

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the scope thereof, it is to be understood that the invention is not limited to the specific embodiments thereof except as defined in the appended claims.

CLAIM OF PRIORITY

This application claims priority from Japanese Patent Application No. 2003-376191 filed Nov. 5, 2003, which is hereby incorporated by reference herein.

What is claimed is:

1. A document processing method of documenting image data for a plurality of pages including non-blank and blank pages obtained by double-sided scanning of an original containing a single-sided printed part and a double-sided printed part into document information having a hierarchical structure having as building elements pages and a group of pages having a common attribute, the method comprising:
a first blank determination step of determining on the basis of the image data whether a page subsequent to a non-blank page is blank;
a second blank determination step of determining, when the page subsequent to the non-blank page is determined in the first blank determination step to be blank, whether a page subsequent to the next non-blank page is blank; and
a documentation step of organizing, when the page subsequent to the non-blank page is determined in the first blank determination step to be blank and when the page subsequent to the next non-blank page is determined in the second blank determination step to be blank, the non-blank pages into a group, and saving the group as document information having a single-sided printing attribute serving as an attribute assigned to the group; and after successive non-blank pages, when the page subsequent to the non-blank page is determined in the first blank determination step to be blank and when the page subsequent to the next non-blank page is determined in the second blank determination step not to be blank, regarding the blank page between the non-blank pages as a break, organizing the non-blank pages prior and subsequent to the break into groups, and saving the groups as document information having a double-sided printing attribute serving as an attribute assigned to the groups.

2. The document processing method according to claim 1, further comprising:
a printing attribute issuing step of issuing, when printing the document information having the single-/double-sided printing attribute assigned to each group of pages, a printing attribute to a printer driver every time the printing attribute of the group of pages changes and outputting the document information for each group of pages; and
a printing control step of generating, using the printer driver, a print job for controlling single-/double-sided printing in accordance with each printing attribute issued in the printing attribute issuing step and each group of pages.

3. The document processing method according to claim 1, further comprising a setting step of setting whether to apply a single-sided page after a group of double-sided non-blank pages as the final page of the group of double-sided pages,
wherein, when the single-sided page after the group of double-sided non-blank pages is set in the setting step not to be applied as the final page of the group of double-sided pages, in the documentation step, after the successive non-blank pages, when the page subsequent to the non-blank page is determined in the first blank determination step to be blank, the successive non-blank pages are organized into a group, and the group is saved as document information having a double-sided printing attribute serving as an attribute assigned to the group; and the non-blank page whose subsequent page is blank is organized into another group, and the group is saved as document information having a single-sided printing attribute serving as an attribute assigned to the group.

4. The document processing method according to claim 1, further comprising a third blank determination step of determining on the basis of the image data whether an odd-numbered page serving as a surface of the original is blank,
wherein, in the documentation step, when two surfaces of the original are determined to be blank in the first blank determination step and the third blank determination step, image data corresponding to blank pages serving as the two surfaces of the original are not document.

5. A document processing method for a document processing apparatus that has a printer driver for generating print data to be printed by a printer, that receives image data for a plurality of pages including non-blank and blank pages obtained by double-sided scanning of an original containing a single-sided printed part and a double-sided printed part, and that documents the image data into document information having a hierarchical structure having as building elements pages and a group of pages having a common attribute, the method comprising:

a blank determination step of determining, on the basis of the image data for the plurality of pages including the non-blank and blank pages, whether a page subsequent to a non-blank page is blank;

a documentation step of organizing, when the page subsequent to the non-blank page is determined in the blank determination step to be blank, the non-blank into a group and saving the group as document information having a single-sided printing attribute serving as an attribute assigned to the group: and, when the page subsequent to the non-blank page is determined in the blank determination step not to be blank, organizing the non-blank page and the page subsequent to the non-blank page into a group and saving the group as document information having a double-sided printing attribute serving as an attribute assigned to the group;

a printing attribute issuing step of issuing, when the document information having the single-/double-sided printing attribute assigned to each group of pages is instructed to be printed, a printing attribute to the printer driver every time the printing attribute of the group of pages changes and outputting the document information for each group of pages; and a printing control step of generating, using the printer driver, a print job for controlling single-/double-sided printing by the printer in accordance with each printing attribute issued in the printing attribute issuing step and each group of pages.

6. The document processing method according to claim 5, further comprising a detection step of detecting input of the image of the image data into a specific folder by periodically monitoring the specific folder, wherein, when input of the image data is detected in the detection step, the blank determination step and the documentation step are executed for the input image data.

7. The document processing method according to claim 5, further comprising a second blank determination step of determining, when the page subsequent to the non-blank page is determined in the blank determination step to be blank, whether a page subsequent to the next non-blank page is blank, wherein, when the page subsequent to the non-blank page is determined in the blank determination step to be blank and when the page subsequent to the next non-blank page is determined in the second blank determination step to be blank, in the documentation step, the non-blank pages are organized into a group, and the group is saved as document information having a single-sided printing attribute serving as an attribute assigned to the group, and wherein, after successive non-blank pages, when the page subsequent to the non-blank page is determined in the blank determination step to be blank and when the page subsequent to the next non-blank page is determined in the second blank determination step not to be blank, in the documentation step, the blank page between the non-blank pages is regarded as a break, the non-blank pages prior and subsequent to the break are organized into groups, and the groups are saved as document information having a double-sided printing attribute serving as an attribute as signed to the groups.

8. A document processing apparatus for documenting image data for a plurality of pages including non-blank pages obtained by double-sided scanning of an original containing a single-sided printed and a double-sided printed part into document information having a hierarchical structure having as building element pages and a group of pages having a common attribute, the apparatus comprising:

first blank determination means for determining on the basis of the image data whether a page subsequent to a non-blank page is blank;

a second blank determination means for determining, when the page subsequent to the non-blank page is determined by the first blank determination means to be blank, whether a page subsequent to the next non-blank page is blank; and documentation means for organizing, when the page subsequent to the non-blank page is determined by the first blank determination means to be blank and when the page subsequent to the next non-blank page is determined by the second blank determination means to be blank, the non blank pages into a group, and saving the group as document information having a single-sided printing attribute serving as an attribute assigned to the group; and, after successive non-blank pages, when the page subsequent to the non-blank page is determined by the first blank determination means to be blank and when the page subsequent to the next non-blank is determined by the second blank determination means not to be blank, regarding the blank page between the non-blank pages as a break, regarding the blank page between the non-blank pages as a break, organizing the non-blank pages prior and subsequent to the break into groups, and saving the groups as document information having a double-sided printing attribute serving as an attribute assigned to the groups.

9. The document printing apparatus according to claim 8, further comprising:

printing attribute issuing means for issuing, when printing the document information having the single-/double-sided printing attribute assigned to each group of pages, a printing attribute to a printer driver every time the printing attribute of the group of pages changes and outputting the document information for each group of pages; and printing control means for generating, using the printer driver, a print job for controlling single-/double-sided printing by a printer in accordance with each printing attribute issued by the printing attribute issuing means and each group of pages.

10. The document processing apparatus according to claim 8, further comprising setting means for setting whether to apply a single-sided page after a group of double-sided non-blank pages as the final page of the group of double-sided pages, wherein, when the single-sided page after the group of double-sided non-blank pages is set by the setting means not to be applied as the final page of the group of double-sided pages, after the successive non-blank pages, when the page subsequent to the non-blank page is determined by the first blank determination means to be blank, the documentation means organizes the successive non-blank pages into a group and saves the group as document information having a double-sided printing attribute serving as an attribute assigned to the group; and the documentation means organizes the non-blank pages whose subsequent page is blank into another group and saves the group as document information having a single-sided printing attribute serving as an attribute assigned to the group.

11. The document processing apparatus according to claim 8, further comprising third blank determination means for determining on the basis of the image data whether an odd-numbered page serving as a surface of the original is blank, wherein, when two surfaces of the original are determined to be blank by the first blank determination means and the third blank determination means, the documentation means does not document image data corresponding to blank pages serving as the two surfaces of the original.

12. A document processing apparatus that has a printer driver for generating print data to be printed by a printer, that receives image data for a plurality of pages including non-blank and blank pages obtained by double-sided scanning of an original containing a single-sided printed part and a double-sided printed part, and that documents the image data into document information having a hierarchical structure having as building elements pages and a group of pages having a common attribute, the apparatus comprising:

blank determination means for determining, on the basis of the image data for the plurality of pages including the non-blank and blank pages, whether a page subsequent to a non-blank page is blank;

documentation means for organizing, when the page subsequent to the non-blank page is determined by the blank determination means to be blank, the non-blank page into a group and saving the group as document information having a single-sided printing attribute serving as an attribute assigned to the group; and, when the page subsequent to the non-blank page is determined by the blank determination means not to be blank, organizing the non-blank page and the page subsequent to the non-blank page into a group and saving the group as document information having a double-sided printing attribute serving as an attribute assigned to the group;

printing attribute issuing means for issuing, when the document information having the single-/double-sided printing attribute assigned to each group of pages is instructed to be printed, a printing attribute to the printer driver every time the printing attribute of the group of pages changes and outputting the document information for each group of pages; and printing control means for generating, using the printer driver, a print job for controlling single-/double-sided printing by the printer in accordance with each printing attribute issued by the printing attribute issuing means and each group of pages.

13. The document processing apparatus according to claim 11, further comprising detection means for detecting input of the image data into a specific folder by periodically monitoring the specific folder, wherein when input of the image data is detected by the detection means, the blank determination means and the documentation means are executed for the input image data.

14. The document processing apparatus according to claim 12, further comprising second blank determination means for determining, when the page subsequent to the non-blank page is determined by the blank determination means to be blank, whether a page subsequent to the next non-blank page is blank, wherein, when the page subsequent to the non-blank page is determined by the blank determination means to be blank and when the page subsequent to the next non-blank page is determined by the second blank determination means to be blank, the documentation means organizes the non-blank pages into a group and saves the group as document information having a single-sided printing attribute serving as an attribute assigned to the group, and wherein, after successive non-blank pages, when the page subsequent to the non-blank page is determined by the blank determination means to be blank and when the page subsequent to the next non-blank page is determined by the second blank determination means not to be blank, the documentation means regards the blank page between the non-blank pages as a break, organizes the non-blank pages prior and subsequent to the break into groups, and saves the groups as document information having a double-sided printing attribute serving as an attribute assigned to the groups.

15. A program stored in a computer-readable storage medium for causing a computer to document image data for a plurality of pages including non-blank and blank pages obtained by double-sided scanning of an original containing a single-sided printed part and a double-sided printed part into document information having a hierarchical structure having as building elements pages and a group of pages having a common attribute, the program allowing the computer to function as:

first blank determination means for determining on the basis of the image data whether a page subsequent to a non-blank page is blank;

second blank determination means for determining, when the page subsequent to the non-blank page is determined by the first blank determination means to be blank, whether a page subsequent to the next non-blank page is blank; and documentation means for organizing, when the page subsequent to the non-blank page is determined by the first blank determination means to be blank and when the page subsequent to the next non-blank page is determined by the second blank determination means to be blank, the non-blank pages into a group, and saving the group as document information having a single-sided printing attribute serving as an attribute assigned to the group; and, after successive non-blank pages, when the page subsequent to the non-blank page is determined by the first blank determination means to be blank and when the page subsequent to the next non-blank page is determined by the second blank determination means not to be blank, regarding the blank page between the non-blank pages as a break, organizing the non-blank pages prior and subsequent to the break into groups, and saving the groups as document information having a double-sided printing attribute serving as an attribute assigned to the groups.

16. The program according to claim 15, further allowing the computer to function as:

printing attribute issuing means for issuing, when printing the document information having the single-/double-sided printing attribute assigned to each group of pages, a printing attribute to a printer driver every time the printing attribute of the group of pages changes and outputting the document information for each group of pages; and printing control means for generating, using the printer driver, a print job for controlling single-/double-sided printing by a printer in accordance with each printing attribute issued by the printing attribute issuing means and each group of pages.

17. The program according to claim 15, further allowing the computer to function as setting means for setting whether to apply a single-sided page after a group of double-sided non-blank pages as the final page of the group of double-sided pages,
   wherein, when the single-sided page after the group of double-sided non-blank pages is set by the setting means not to be applied as the final page of the group of double-sided pages, after the successive non-blank pages, when the page subsequent to the non-blank page is determined by the first blank determination means to be blank, the documentation means organizes the successive non-blank pages into a group and saves the group as document information having a double-sided printing attribute serving as an attribute assigned to the group; and the documentation means organizes the non-blank page whose subsequent page is blank into another group and saves the group as document information having a single-sided printing attribute serving as an attribute assigned to the group.

18. The program according to claim 15, further allowing the computer to function as third blank determination for determining on the basis of the image data whether an odd-numbered page serving as a surface of the original is blank,
   wherein, when two surfaces of the original are determined to be blank by the first blank determination means and the third blank determination means, the documentation means does not document image data corresponding to blank pages serving as the two surfaces of the original.

19. A program stored in a computer readable-medium for causing a computer, in which a printer driver for generating print data to be printed by a printer is operating, to receive image data for a plurality of pages including non-blank and blank pages obtained by double-sided scanning of an original containing a single-sided printed part and a double-sided printed part and documenting the image data into document information having a hierarchical structure having as building elements pages and a group of pages having a common attribute, the program allowing the computer to function as:
   blank determination means for determining, on the basis of the image data for the plurality of pages including the non-blank and blank pages, whether a page subsequent to a non-blank page is blank;
   documentation means for organizing, when the page subsequent to the non-blank page is determined by the blank determination means to be blank, the non-blank page into a group and saving the group as document information having a single-sided printing attribute serving as an attribute assigned to the group; and, when the page subsequent to the non-blank page is determined by the blank determination means not to be blank, organizing the non-blank page and the page subsequent to the non-blank page into a group and saving the group as document information having a double-sided printing attribute serving as an attribute assigned to the group;
   printing attribute issuing means for issuing, when the document information having the single-/double-sided printing attribute assigned to each group of pages is instructed to be printed, a printing attribute to the printer driver every time the printing attribute of the group of pages changes and outputting the document information for each group of pages; and
   printing control means for generating, using the printer driver, a print job for controlling single-/double-sided printing by the printer in accordance with each printing attribute issued by the printing attribute issuing means and each group of pages.

20. The program according to claim 19, further allowing the computer to function as detection means for detecting input of the image data into a specific folder by periodically monitoring the specific folder,
   wherein, when input of the image data is detected by the detection means, the blank determination means and the documentation means are executed for the input image data.

21. The program according to claim 19, further allowing the computer to function as second blank determination means for determining, when the page subsequent to the non-blank page is determined by the blank determination means to be blank, whether a page subsequent to the next non-blank page is blank,
   wherein, when the page subsequent to the non-blank page is determined by the blank determination means to be blank and when the page subsequent to the next non-blank page is determined by the second blank determination means to be blank, the documentation means organizes the non-blank pages into a group and saves the group as document information having a single-sided printing attribute serving as an attribute assigned to the group, and
   wherein, after successive non-blank pages, when the page subsequent to the non-blank page is determined by the blank determination means to be blank and when the page subsequent to the next non-blank page is determined by the second blank determination means not be blank, the documentation means regards the blank page between the non-blank pages as a break, organizes the non-blank pages prior and subsequent to the break into groups, and saves the groups as document information having a double-sided printing attribute serving as an attribute assigned to the groups.

* * * * *

UNITED STATES PATENT AND TRADEMARK OFFICE
CERTIFICATE OF CORRECTION

| | |
|---|---|
| PATENT NO. | : 7,268,909 B2 |
| APPLICATION NO. | : 10/978415 |
| DATED | : September 11, 2007 |
| INVENTOR(S) | : Koji Nakagiri |

It is certified that error appears in the above-identified patent and that said Letters Patent is hereby corrected as shown below:

<u>IN THE DRAWINGS</u>:
Sheet 5, Fig. 4A, "LETER+LEDGER" should read --LETTER+LEDGER--.

<u>COLUMN 2</u>:
Line 31, "comprises" should read --comprises:--.
Line 47, "comprising" should read --comprising:--.

<u>COLUMN 5</u>:
Line 2, "an" should be deleted.

<u>COLUMN 15</u>:
Line 15, "delete" should read --deletion--.

<u>COLUMN 32</u>:
Line 35, "a" should read --an--.

<u>COLUMN 35</u>:
Line 12, "group:" should read --group;--.
Line 64, "as signed" should read --assigned--.
Line 66, "non-blank" should read --non-blank and blank--.

<u>COLUMN 36</u>:
Line 1, "single-sided printed" should read --single-sided printed part--.
Line 3, "element" should read --elements--.
Line 18, "non blank" should read --non-blank--.
Line 25, "blank is" should read --blank page is--.
Line 27, "regarding the" should be deleted.
Line 28, "blank page between the non-blank pages as a break," should be deleted.

UNITED STATES PATENT AND TRADEMARK OFFICE
CERTIFICATE OF CORRECTION

PATENT NO. : 7,268,909 B2
APPLICATION NO. : 10/978415
DATED : September 11, 2007
INVENTOR(S) : Koji Nakagiri It is certified that error appears in the above-identified patent and that said Letters Patent is hereby corrected as shown below:

COLUMN 39:
Line 22, "determination" should read --determination means--.
Line 32, "computer readable-medium" should read --computer-readable medium--.

COLUMN 40:
Line 45, "not" should read --not to--.

Signed and Sealed this

Twenty-ninth Day of April, 2008

JON W. DUDAS
*Director of the United States Patent and Trademark Office*